United States Patent
Karaoglu et al.

(10) Patent No.: US 12,475,552 B2
(45) Date of Patent: Nov. 18, 2025

(54) METHODS AND APPARATUSES FOR GENERATING ANATOMICAL MODELS USING DIAGNOSTIC IMAGES

(71) Applicant: Boston Scientific Scimed Inc., Maple Grove, MN (US)

(72) Inventors: Mert Karaoglu, Munich (DE); Alexander Ladikos, Munich (DE)

(73) Assignee: Boston Scientific Scimed, Inc., Maple Grove, MN (US)

( * ) Notice: Subject to any disclaimer, the term of this patent is extended or adjusted under 35 U.S.C. 154(b) by 833 days.

(21) Appl. No.: 17/576,271

(22) Filed: Jan. 14, 2022

(65) Prior Publication Data

US 2022/0230303 A1 Jul. 21, 2022

Related U.S. Application Data

(60) Provisional application No. 63/138,186, filed on Jan. 15, 2021.

(51) Int. Cl.
*G06T 7/00* (2017.01)
*A61B 34/10* (2016.01)
(Continued)

(52) U.S. Cl.
CPC ............ *G06T 7/0012* (2013.01); *A61B 34/10* (2016.02); *A61B 34/20* (2016.02); *G06V 10/25* (2022.01);
(Continued)

(58) Field of Classification Search
CPC ......... G06T 7/0012; G06T 2207/10068; G06T 2207/30061; G06T 7/55; G06T 7/0014;
(Continued)

(56) References Cited

U.S. PATENT DOCUMENTS

| 2019/0252073 A1* | 8/2019 | Hsu .................. G06T 7/0012 |
| 2021/0280312 A1* | 9/2021 | Freedman ............ G16H 30/40 |
| 2022/0101048 A1* | 3/2022 | Tan ..................... G16H 50/20 |

OTHER PUBLICATIONS

Choi et al; "Robust Reconstruction of Indoor Scenes," Computer Vision Foundation, 10 pages, 2015.
(Continued)

*Primary Examiner* — Kent Yip
(74) *Attorney, Agent, or Firm* — Seager, Tufte & Wickhem, LLP

(57) ABSTRACT

A diagnostic imaging process and system may operate to generate a three-dimensional anatomical model based on monocular color endoscopic images. In one example, an apparatus may include a processor and a memory coupled to processor. The memory may include instructions that, when executed by the processor, may cause the processor to access a plurality of endoscopic training images comprising a plurality of synthetic images and a plurality of real images, access a plurality of depth ground truths associated with the plurality of synthetic images, perform supervised training of at least one computational model using the plurality of synthetic images and the plurality of depth ground truths to generate a synthetic encoder, and perform domain adversarial training on the synthetic encoder using the real images to generate a real image encoder for the at least one computational model. Other embodiments are described.

20 Claims, 13 Drawing Sheets

(51) Int. Cl.
    *A61B 34/20*     (2016.01)
    *G06V 10/25*     (2022.01)
    *G06V 10/44*     (2022.01)
    *G06V 10/774*     (2022.01)

(52) U.S. Cl.
    CPC .......... *G06V 10/454* (2022.01); *G06V 10/774* (2022.01); *A61B 2034/105* (2016.02); *A61B 2034/107* (2016.02); *A61B 2034/2065* (2016.02); *G06T 2207/10068* (2013.01); *G06T 2207/30061* (2013.01)

(58) Field of Classification Search
    CPC . G06T 2207/10024; G06T 2207/20072; G06T 2207/20076; G06T 2207/20081; G06T 2207/20084; G06T 2207/30096; G06T 2207/30172; A61B 1/22; A61B 1/2676
    See application file for complete search history.

(56) References Cited

OTHER PUBLICATIONS

Clevert et al; "Fast and Accurate Deep Network Learning by Exponentional Linear Units (ELUs)," Published as a Conference Paper at ICLR, 14 pages, 2016.
Goodfellow et al; "Generative Adversarial Nets," Departement d'informatique de recherce operationnelle, Montreal, Canada, 9 pages, 2014.
He et al; "Deep Residual Learning for Image Recognition," Computer Vision Foundation, 9 pages, 2016.
Isola et al; "Image-to Image Translation with Conditional Adversarial Networks," Computer Vision Foundation, 10 pages, 2017.
Jin et al; "3D Convolutional Neural Networks with Graph Refinement for Airway Segmentation Using Incomplete Data Labels," 9 pages, Springer International Publishing, 2017.
Laina et al; Deeper Depth Prediction with Fully Convolutional Residual Networks, Published at IEEE International Conference on 3D Vision (3DV) 12 pages, 2016.
Liu et al; "An Intriguing Failing of Convolutional Nerural Networks and the CoorConv Solution," 32nd Conference on Neural Information Processing Systems (NeurIPS 2018), Montreal, Canada, 12 pages, 2018.
Liu et al: "Self-Supervised Learning for Dense depth Estimation in Monocular Endoscopy," The Johns Hopkins University, Baltimore, 11 pages, 2018.
Park et al; "Colored Point Cloud Registration Revisited," Computer Vision Foundation, 10 pages, 2017.
International Search Report and Written Opinion for International Application No. PCT/US2022/012491, date mailed Apr. 29, 2022, 10 pages.
Rau et al; "Implicit Domain Adaption with Conditional Generative Adversarial Networks for Depth Prediction in Endoscopy," International Journal of Assisted Radiology and Surgery, 10 pages, 2019.
Ronneberger et al; "U-Net: Convolutional Networks for Biomedical Image Segmentation," Springer International Publishing, 8 pages, 2015.
Vandakari et al; "Unsupervised Monocular Depth Estimation for Night-Time Images using Adversarial Domain Feature Adaptation," TATA Consultancy Services, India, 17 pages, 2020.

* cited by examiner

METHODS AND APPARATUSES FOR GENERATING ANATOMICAL MODELS USING DIAGNOSTIC IMAGES

CROSS-REFERENCE TO RELATED APPLICATION

The present application claims the benefit of priority under 35 U.S.C. § 119 to U.S. Provisional Application Ser. No. 63/138,186, titled "Techniques for Determining Depth Estimation of Tissue Images" and filed Jan. 15, 2021, the disclosure of which is incorporated herein by reference in its entirety.

FIELD

The disclosure generally relates to processes for examining physical characteristics of a portion of a patient based on images of the portion, and, more particularly, to techniques for generating multi-dimensional models of the portion based on monocular images.

BACKGROUND

Endoscopic examinations provide a minimally-invasive procedure for visual investigation of internal bodily lumens. For example, a bronchoscopy is an endoscopic diagnostic technique for directly examining the airways of the lungs via insertion of a long, thin endoscope (or bronchoscope) through the trachea of a patient and down into the lung pathways. Other types of endoscopes may include a colonoscope for a colonoscopy, a cystoscope for the urinary tract, and an enteroscope for the small intestine. An endoscope may generally include a lighting system to illuminate internal patient cavities, a sample recovery system to take samples within the patient, and an imaging system to capture internal images of the patient for transmission to a database and/or an operator.

During an endoscopic procedure using conventional systems, a main challenge is the localization of the endoscope inside the interior lumens of the patient (for instance, bronchi and bronchioles for a bronchoscopy) for accurate and efficient navigation. Computer vision systems have been developed to provide navigational assistance to an operator for guiding the endoscope to a target. However, existing endoscopes generally have an imaging device that provides a restricted two-dimensional or monocular field of view that lacks adequate depth perception. Accordingly, it is difficult for an operator to orient and navigate the endoscope within the interior lumens of the patient due to insufficient visual information, particularly during a live diagnostic procedure. The inadequacy of the computer-assistance systems causes achievement of a successful procedure to be more difficult and the overall outcome of endoscopic procedures to be highly dependent on the operator's experience and skills.

One navigation solution involves the use of tracking systems (for example, an electromagnetic (EM) tracking system) that rely on pre-operative diagnostic images (for example, computed tomography (CT) images) of the patient. Such solutions have multiple drawbacks, including, without limitation, requiring extensive pre-operative analysis of the patient and the inability to compensate for the motion of the lungs during the procedure, resulting in inaccuracy in the localization. Other navigation systems use vision-based techniques that require additional device hardware, such as sensors, and/or rely on complex data manipulation of patient images that limit their effectiveness, particularly in a real-time surgical environment.

It is with respect to these and other considerations that the present improvements may be useful.

SUMMARY

This summary of the disclosure is given to aid understanding, and one of skill in the art will understand that each of the various features of the disclosure may advantageously be used separately in some instances, or in combination with other features of the disclosure in other instances. No limitation as to the scope of the claimed subject matter is intended by either the inclusion or non-inclusion of elements, components, or the like in this summary. In one embodiment, the present disclosure relates to In accordance with various features of the described embodiments is an apparatus that includes at least one processor and a memory coupled to the at least one processor. The memory may include instructions that, when executed by the at least one processor, cause the at least one processor to: access a plurality of endoscopic training images comprising a plurality of synthetic images and a plurality of real images, access a plurality of depth ground truths associated with the plurality of synthetic images, perform supervised training of at least one computational model using the plurality of synthetic images and the plurality of depth ground truths to generate a synthetic encoder and synthetic decoder, and perform domain adversarial training on the synthetic encoder using the real images to generate a real image encoder for the at least one computational model.

In some embodiments of the apparatus, the instructions, when executed by the at least one processor, may cause the at least one processor to perform an inference process on the plurality of real images using the real image encoder and the synthetic decoder to generate depth images and confidence maps. In various embodiments of the apparatus, the real image encoder may include at least one coordinate convolution layer.

In some embodiments of the apparatus, the plurality of endoscopic training images may include bronchoscopic images. In various embodiments of the apparatus, the plurality of endoscopic training images comprising images generated via bronchoscope imaging of a phantom device.

In exemplary embodiments of the apparatus, the instructions, when executed by the at least one processor, may cause the at least one processor to: provide a patient image as input to the trained computational model, generate at least one anatomical model corresponding to the patient image. In various embodiments of the apparatus, the instructions, when executed by the at least one processor, may cause the at least one processor to generate a depth image and a confidence map for the patient image.

In some embodiments of the apparatus, the anatomical model may include a three-dimensional point cloud. In various embodiments of the apparatus, the instructions, when executed by the at least one processor, may cause the at least one processor to present the anatomical model on a display device to facilitate navigation of an endoscopic device.

In accordance with various features of the described embodiments is computer-implemented method that may include, via at least one processor of a computing device: accessing a plurality of endoscopic training images comprising a plurality of synthetic images and a plurality of real images; accessing a plurality of depth ground truths associated with the plurality of synthetic images; performing supervised training of at least one computational model using the plurality of synthetic images and the plurality of depth ground truths to generate a synthetic encoder and synthetic decoder; and performing domain adversarial training on the synthetic encoder using the real images to generate a real image encoder for the at least one computational model.

In some embodiments of the method, the method may include performing an inference process on the plurality of real images using the real image encoder and the synthetic decoder to generate depth images and confidence maps. In various embodiments of the method, the real image encoder may include at least one coordinate convolution layer.

In some embodiments of the method, the plurality of endoscopic training images may include bronchoscopic images. In various embodiments of the method, the plurality of endoscopic training images may include images generated via bronchoscope imaging of a phantom device.

In exemplary embodiments of the method, the method may include: providing a patient image as input to the trained computational model, generating at least one anatomical model corresponding to the patient image. In various embodiments of the method, the method may include generating a depth image and a confidence map for the patient image.

In some embodiments of the method, the anatomical model may include a three-dimensional point cloud. In various embodiments of the method, the method may include presenting the anatomical model on a display device to facilitate navigation of an endoscopic device. In some embodiments of the method, the method may include performing an examination of a portion of a patient represented by the anatomical model using the endoscopic device.

In accordance with various features of the described embodiments is an endoscope imaging system that may include an endoscope and a computing device operatively coupled to the endoscope. The computing device may include at least one processor and a memory coupled to the at least one processor. The memory may include instructions that, when executed by the at least one processor, may cause the at least one processor to access a plurality of endoscopic training images comprising a plurality of synthetic images and a plurality of real images, access a plurality of depth ground truths associated with the plurality of synthetic images, perform supervised training of at least one computational model using the plurality of synthetic images and the plurality of depth ground truths to generate a synthetic encoder and synthetic decoder, perform domain adversarial training on the synthetic encoder using the real images to generate a real image encoder for the at least one computational model.

In some embodiments of the system, the endoscope may include a bronchoscope.

In some embodiments of the system, the instructions, when executed by the at least one processor, may cause the at least one processor to provide a patient image as input to the trained computational model, the patient image captured via the endoscope, and generate at least one anatomical model corresponding to the patient image. In some embodiments of the system, the instructions, when executed by the at least one processor, may cause the at least one processor to present the anatomical model on a display device to facilitate navigation of the endoscopic device within a portion of the patient represented by the anatomical model.

BRIEF DESCRIPTION OF THE DRAWINGS

By way of example, specific embodiments of the disclosed machine will now be described, with reference to the accompanying drawings, in which.

DETAILED DESCRIPTION

Figure 1:
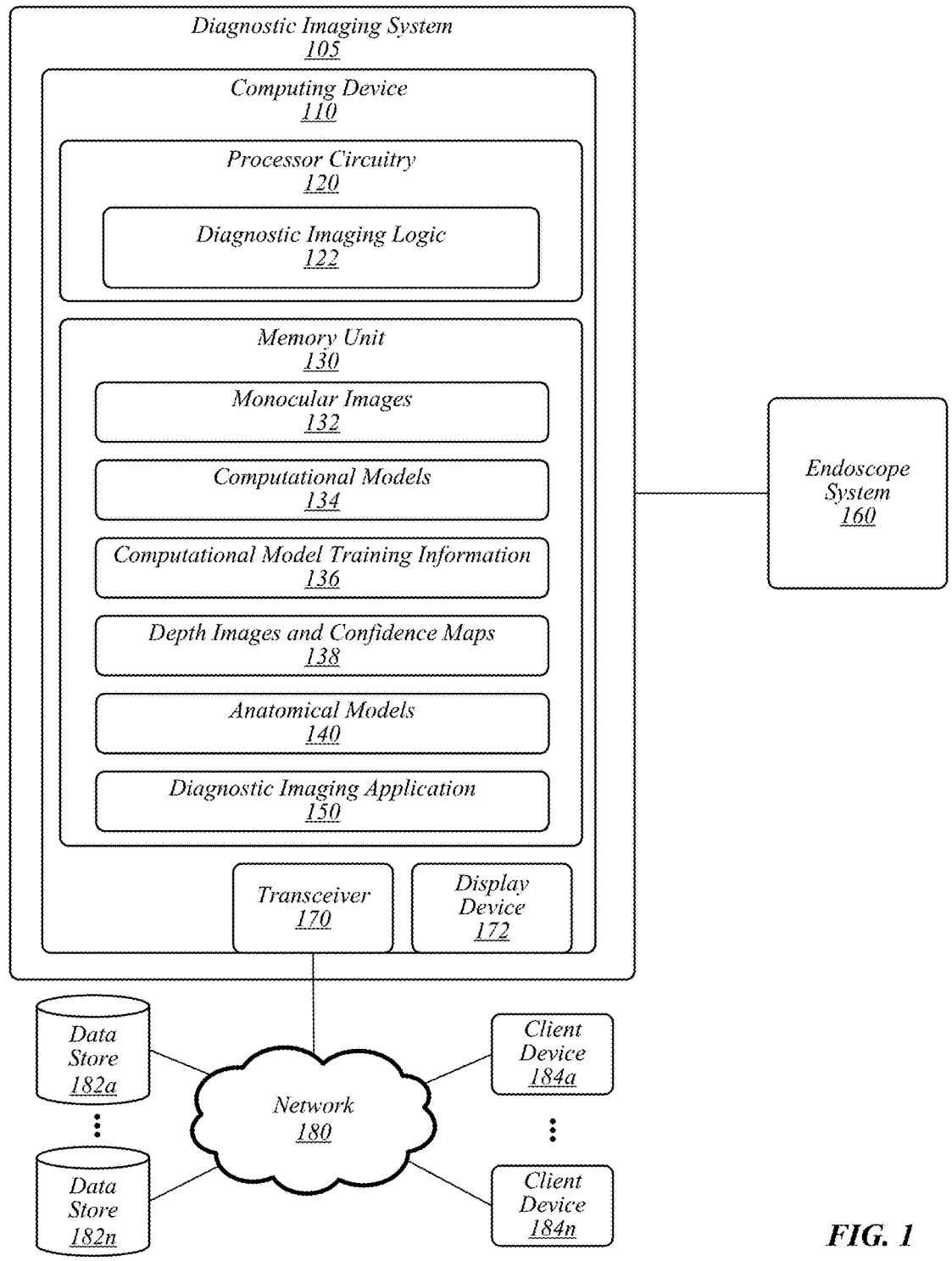
FIG. 1 illustrates a first exemplary operating environment in accordance with the present disclosure.

The present embodiments will now be described more fully hereinafter with reference to the accompanying drawings, in which several exemplary embodiments are shown. The subject matter of the present disclosure, however, may be embodied in many different forms and should not be construed as limited to the embodiments set forth herein. Rather, these embodiments are provided so that this disclosure will be thorough and complete, and willfully convey the scope of the subject matter to those skilled in the art. In the drawings, like numbers refer to like elements throughout.

Various features of diagnostic imaging devices and processes will now be described more fully hereinafter with reference to the accompanying drawings, in which one or more features of the diagnostic imaging processes will be shown and described. It should be appreciated that the various features or the like described hereinafter may be used independently of, or in combination, with each other. It will be appreciated that a diagnostic imaging process, method, technique, device, system, component, and/or portion thereof as disclosed herein may be embodied in many different forms and should not be construed as being limited to the embodiments set forth herein. Rather, these embodiments are provided so that this disclosure will convey certain or features of the diagnostic imaging devices and/or processes to those skilled in the art.

Disclosed herein are diagnostic imaging processes operative to generate anatomical models from source images. In some embodiments, the anatomical models may be or may include three-dimensional (3D) images, graphical user interface (GUI) objects, models, 3D models, and/or the like configured to provide 3D visualization of patient anatomical scenes. In various embodiments, the source images may be or may include non-3D source images (for example, two-dimensional or monocular images). In one example, the source images may include monocular images from an endoscope. In various embodiments, the source images may include at least one color monocular image from an endoscope.

Although an endoscope and, in particular, a bronchoscope, are used as illustrative diagnostic imaging devices, embodiments are not so limited as images from any type of image capturing system, including other types of diagnostic imaging systems, capable of operating according to some embodiments is contemplated in the present disclosure.

The present disclosure describes monocular endoscope images as examples of diagnostic images, source images, and/or a basis for synthetic images in the present disclosure; however embodiments are not so limited. More specifically, any type of source image (including real or synthetic images) capable of operating with diagnostic imaging processes configured according to some embodiments is contemplated in the present disclosure.

In various embodiments, the diagnostic imaging process may include a computational model training process operative to train a computational model to generate the anatomical models based on source image input. Illustrative and non-limiting examples of computational models may include a machine learning (ML) model, an artificial intelligence (AI) model, a neural network (NN), an artificial neural network (ANN), a convolutional neural network (CNN), a deep learning (DL) network, a deep neural network (DNN), a recurrent neural network (RNN), encoder-decoder networks, a residual network (ResNet), a U-Net, a fully convolutional network (FCN), combinations thereof, variations thereof, and/or the like. In exemplary embodiments, the computational model training process may include training a computational model with simulated images in a first training process and training the computational model with actual source images in a second training process.

Depth estimation from monocular diagnostic images is a core task in localization and 3D reconstruction pipelines for anatomical scenes, for example, bronchoscopic scenes. Conventional processes have attempted various supervised and self-supervised ML- and DL-based approaches using actual patient images. However, the lack of labeled data and the feature-scarce texture of endoscopic images (for instance, of the lungs, colon, intestines, and/or the like) make the utilization of these methods ineffective.

Attempts have been made to register electromagnetic (EM) tracking data captured from a bronchoscope to the segmented airway tree of pre-operative CT-scan data. In addition to the sensory errors caused by electromagnetic distortion, anatomical deformations are a principal challenge for EM-based approaches that render them impractical to use in a live surgical environment. Vision-based approaches have also been proposed, inspired by success in natural scenes. For example, direct and feature-based video-CT registration techniques and simultaneous localization and mapping (SLAM) pipelines have been investigated in various studies. However, the feature-scarce texture and the photometric-inconsistencies caused by specular reflections found in anatomical scenes (for instance, interior lung and intestinal lumens) cause these techniques to be insufficient for medical diagnostic, particularly endoscopic, procedures.

The shortcomings of the direct and feature-based methods have led researchers to focus on adopting depth information to exploit the direct relationship with scene geometry. Following the advancements in learning-based techniques, supervised learning has become a method for monocular depth estimation applied to natural scenes. However, it is challenging to employ for endoscopy tasks due to the difficulty of obtaining ground-truth data. An alternative way is to train the network on synthetic images with their rendered depth ground-truths. But due to the domain gap between the real and synthetic images, these models tend to suffer from a performance drop at inference time and, therefore, are not capable of being used in a real-world medical diagnostic environment.

Accordingly, some embodiments may provide image processing methods that include an alternative domain-adaptive approach using, among other things, a two-step structure that first trains a depth estimation network with labeled synthetic images in a supervised manner, then adopts an unsupervised adversarial domain feature adaptation process to improve and optimize performance on real patient images.

Some embodiments may provide diagnostic image processing methods that may operate to, among other things, improve computing device performance on real patient images by a considerable margin and may be employed in 3D diagnostic imaging reconstruction pipelines. In various embodiments, for example, a DL-based depth estimation approach may be used for, among other things, the 3D reconstruction of endoscopic scenes. Due to the lack of labeled data, the computational model may be trained on synthetic images. Various embodiments may provide methods and systems configured to use the adversarial domain-feature adaptation element. Applied at the feature level, the adversarial domain-feature adaptation element may, among other things, compensate for the network's low generalizability on real patient images.

Apparatuses and methods operating according to some embodiments may provide multiple technological advantages and technical features over conventional systems. One non-limiting example of a technological advantage may include training a computational model to efficiently generate realistic and accurate 3D anatomical models based on non-3D (for instance, monocular) diagnostic images (for instance, endoscopic images). Another non-limiting example of a technological advantage may include generating 3D anatomical models with the use of a monocular imaging device, such as an endoscope, without requiring additional hardware, such as additional cameras, sensors, and/or the like. In a further non-limiting example of a technological advantage, a monocular endoscope may be used with models generated according to some embodiments to navigate interior patient lumens (for instance, the lungs) to efficiently and effectively perform diagnostic testing and sample collection of interior patient lumens without requiring invasive surgical procedures, such as biopsies (for instance, an open-lung biopsy) or needle aspiration procedures.

Systems and methods according to some embodiments may be integrated into multiple practical applications, including diagnosing a medical condition, providing a treatment recommendation, performing a medical procedure, providing treatment to a patient, and/or the like. In one particular example, a diagnostic imaging process according to some embodiments may be used to provide a minimally invasive bronchoscopic procedure to provide a pathology examination of lung tissue to screen for lung cancer. Conventional pathology examinations for lung cancer include the invasive surgical procedures of open-lung biopsy, trans-thoracic needle aspiration (TTNA), or trans-bronchial needle aspiration (TBNA). Existing bronchoscopes are not capable of efficient or effective guidance through the lungs using the monocular images provided by the scope camera sensors. However, some embodiments provide diagnostic imaging processes that are able to generate 3D anatomical models using images from existing monocular bronchoscope camera sensors that may be used by a medical professional to guide a bronchoscope through the lungs to examine and/or obtain a sample from a target area for lung cancer.

Some embodiments may include software, hardware, and/or a combination thereof that are included as part of and/or are operatively accessible to a medical diagnostic system or tool. For example, some embodiments may include software, hardware, and/or a combination thereof that are included as part of or are operatively accessible to an endoscopic system, such as a bronchoscopic system for use during a bronchoscopic procedure (for instance, to provide depth estimation for guidance of elements of the bronchoscopic system).

FIG. 1 illustrates an example of an operating environment 100 that may be representative of some embodiments. As shown in FIG. 1, operating environment 100 may include a diagnostic imaging system 105. In various embodiments, diagnostic imaging system 105 may include a computing device 110 communicatively coupled to a network 180 via a transceiver 170. In some embodiments, computing device 110 may be a server computer, personal computer (PC), workstation, and/or other type of computing device.

Computing device 110 may be configured to manage, among other things, operational aspects of a diagnostic imaging process according to some embodiments. Although only one computing device 110 is depicted in FIG. 1, embodiments are not so limited as computing device 110 may be, may include, and/or may be distributed over multiple computing platforms. In various embodiments, the functions, operations, configurations, data storage functions, applications, logic, and/or the like described with respect to computing device 110 may be performed by and/or stored in one or more other computing devices (not shown), for example, coupled to computing device 110 via network 180 (for instance, one or more of client devices 184a-n). A single computing device 110 is depicted for illustrative purposes only to simplify the figure. Embodiments are not limited in this context.

Computing device 110 may include a processor circuitry 120 that may include and/or may access various logics for performing processes according to some embodiments. For instance, processor circuitry 120 may include and/or may access a diagnostic imaging logic 122. Processing circuitry 120, diagnostic imaging logic 122, and/or portions thereof may be implemented in hardware, software, or a combination thereof. As used in this application, the terms "logic," "component," "layer," "system," "circuitry," "decoder," "encoder," "control loop," and/or "module" are intended to refer to a computer-related entity, either hardware, a combination of hardware and software, software, or software in execution, examples of which are provided by the exemplary computing architecture 1300. For example, a logic, circuitry, or a module may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, a control loop, a computational model or application, an AI model or application, an ML model or application, a DL model or application, a proportional-integral-derivative (PID) controller, variations thereof, combinations of any of the foregoing, and/or the like.

Although diagnostic imaging logic 122 is depicted in FIG. 1 as being within processor circuitry 120, embodiments are not so limited. For example, diagnostic imaging logic 122 and/or any component thereof may be located within an accelerator, a processor core, an interface, an individual processor die, implemented entirely as a software application (for instance, a diagnostic imaging application 150) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store various types of information and/or applications for a diagnostic imaging process according to some embodiments. For example, memory unit 130 may store monocular images 132, computational models 134, computational model training information 136, depth images 138, anatomical models 140, and/or a diagnostic imaging application 150. In some embodiments, some or all of monocular images 132, computational models 134, computational model training information 136, depth images 138, anatomical models 140, and/or a diagnostic imaging application 150 may be stored in one or more data stores 182a-n accessible to computing device 110 via network 180.

Monocular images 132 may include any non-3D images captured via a diagnostic tool, such as an endoscope of endoscope system 160. In some embodiments, endoscope system 160 may include a bronchoscope. Illustrative and non-limiting examples of endoscope systems 160 may include an EXALT™ Model B single-use bronchoscope provided by the Boston Scientific Corporation of Marlborough, Massachusetts, United States of America. Monocular images 132 may include images of a patient and/or a phantom (i.e., simulated human anatomy device). In some embodiments, endoscope system 160 may be communicatively coupled to computing device 110 via wired and/or wireless communication protocols either directly or through network 180 and/or a client device 184*a*. In various embodiments, computing device 110 may be a part of endoscope system 160, for example, operating as a monitor and/or control device.

Computational models 134 may include any computational model, algorithm, application, process, and/or the like used in a diagnostic imaging application according to some embodiments. Illustrative and non-limiting examples of computational models may include a machine learning (ML) model, an artificial intelligence (AI) model, a neural network (NN), an artificial neural network (ANN), a convolutional neural network (CNN), a deep learning (DL) network, a deep neural network (DNN), a recurrent neural network (RNN), encoder-decoder networks, a residual network (ResNet), a U-Net, a fully convolutional network (FCN), combinations thereof, variations thereof, and/or the like.

In one embodiment, computational models 134 may include a monocular depth image and confidence map estimation model for handling real endoscopic (for instance, bronchoscopy) images. Some embodiments may include an encoder-decoder model, for instance, trained on labeled synthetic images. Various embodiments may include computational models configured using domain adversarial training, for example, trained using real images.

A non-limiting example of the adversarial approach is described in Goodfellow et al., "Generative Adversarial Nets," Advances in Neural Information Processing Systems, pp. 2672-2680 (2014) ("Goodfellow et al."), the contents of which are incorporated by reference as if fully set forth herein. For example, one of the methods to reduce the domain-gap is the adversarial approach based on Goodfellow et al. Essentially, image processing methods and systems according to some embodiments may operate to, among other things, optimize a generative model F by exploiting the adversarial signal from a secondary, discriminative, network A. Trained simultaneously, at every iteration, the generator F tries to improve by formulating a similar distribution to the training set to deceive the discriminator A while A attempts to guess whether its input is generated by F or sampled from the training set. The input of the generator is random noise sampled from a distribution as $p_z(z)$. Bringing it all together to describe a value function V, the pipeline resembles a two-player minimax game, originally defined according to the following $$\min_F \max_A V(A, F) = E_{x \sim p_{data}(x)}[\log A(x)] + E_{z \sim p_z(z)}[\log(1 - A(F(z)))]$$

where $E_x \sim p_{data}(x)$ and $E_z \sim p_z(z)$ are the expected values across the instances of the real and the generated data.

The application of the aforementioned framework on the problem at hand is named as domain adversarial training. In this specific adoption, the generator F acts as the feature extractor and the discriminator A as the domain recognizer. The joint training aims for a hypothesis in which the feature extractor F generates an output vector of the same statistical attributes regardless of the input domain. Depending on the aim of the application, the adversarial loss can be applied at the output level, as in the case of CycleGAN, or at a feature or multiple feature levels as provided in some embodiments.

In various embodiments, computational model training information 136 may include information used to train computational models 134. In some embodiments, training information 136 may include a dataset from a synthetic domain and a dataset from a non-synthetic or real domain. The synthetic domain may include synthetic images of an anatomical region of interest.

For instance, for a bronchoscopy application, the synthetic images may include synthetic images of the internal lumens of the lung. In one embodiment, the synthetic domain may include a plurality of rendered color and depth image pairs (see, for example, FIG. 3). The plurality of synthetic images may include about 1000 images, about 5000, images, about 10,000 images, about 20,000 images, about 40,000 images, about 50,0000 images, about 100,000 images, and any value or range between any of the aforementioned values (including endpoints).

In various embodiments, the real domain may include real images captured via an endoscope within a living organism or phantom. For example, for a bronchoscope application, the real images may include real monocular bronchoscopic images that include pulmonary phantom and/or in-vivo recordings of the lungs of a human or animal (for instance, a dog) (see, for example, FIG. 4).

In some embodiments, depth images 138 may be generated using computational models 136 based on the real and/or synthetic monocular images 132. In various embodiments, depth images 138 may include or may be associated with corresponding confidence maps (see, for example, FIGS. 5-9). In applications where a depth image cannot be captured by an additional sensor, as in the case of endoscopy and bronchoscopy in particular, DL-based methods may be used to estimate or otherwise determine depth images from color images according to some embodiments.

In some embodiments, anatomical models 140 may be generated based on depth images and/or confidence maps 138. Anatomical models 140 may include point cloud or other 3D representations of the anatomy captured in the source images, such as monocular images 132 (see, for example, FIGS. 6 and 10-12). In various embodiments, anatomical models 140 may be generated via a 3D reconstruction pipeline configured according to some embodiments.

In various embodiments, diagnostic imaging logic 122, for example, via diagnostic imaging application 150, may operate to train computational models 134 to analyze patient monocular images 132 to determine depth images and confidence maps 138 and to generate anatomical models 140 based on depth images and confidence maps 138. In some embodiments, the computational models 134 used to determine depth images and confidence maps 138 may be different than the computational models 134 used to determine anatomical models 140.

Diagnostic imaging processes and systems according to some embodiments may be or may include a two-step training structure. In some embodiments, image processing methods and systems may be operative to provide a monocular depth image and confidence map estimation model for handling real endoscopic (for instance, bronchoscopy) images. A first computational model training step may include the supervised training of an encoder-decoder model on the synthetic images. A second computational model training step may include domain adversarial training, in which the real images are incorporated into the training.

Figure 2:
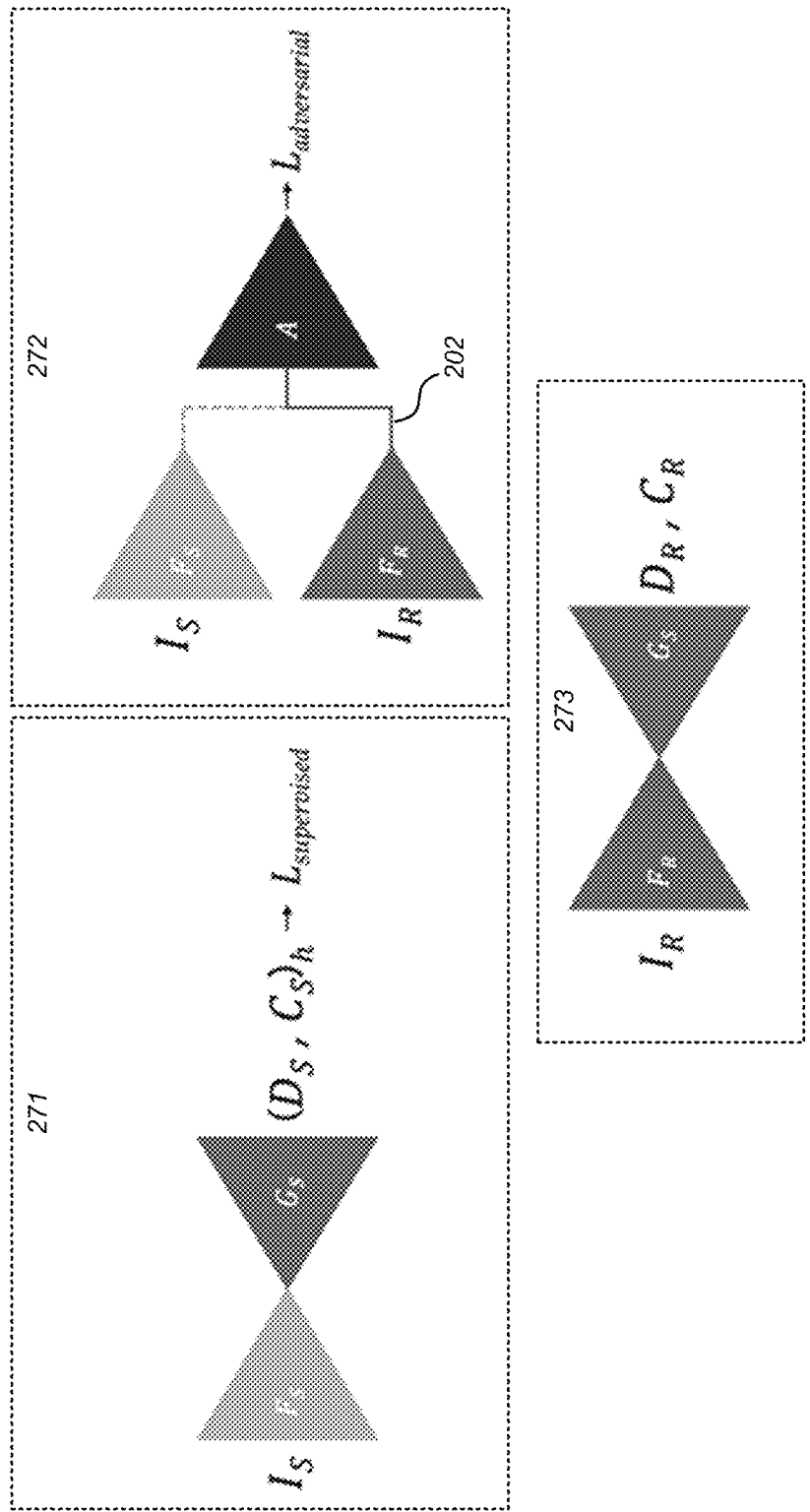
FIG. 2 illustrates computational model training processes in accordance with the present disclosure.

FIG. 2 depicts illustrative computational model training processes in accordance with various features of the present disclosure. In some embodiments, processes 271-273 may be or may be a part of an image processing pipeline. For example, process 271 may include supervised training of the encoder-decoder structure using the synthetic color images $I_S$ and their corresponding depth $D_S$ ground truths. In another example, process 272 may include an adversarial training scheme to train a new encoder $F_R$ for the images from the real domain $I_R$ based on $F_S$ trained at the previous step. $F_R$ may be initialized with the weights of $F_S$. A is the set of discriminators employed at different feature levels of the encoders. In some embodiments, during the optimization, the weights are updated only on flow 202. In a further example, process 273 may include inference on the real domain. $F_R$ is connected to the decoder trained in process 271 ($G_S$) to estimate the depth images $D_R$ and the confidence maps $C_R$.

Figure 3:
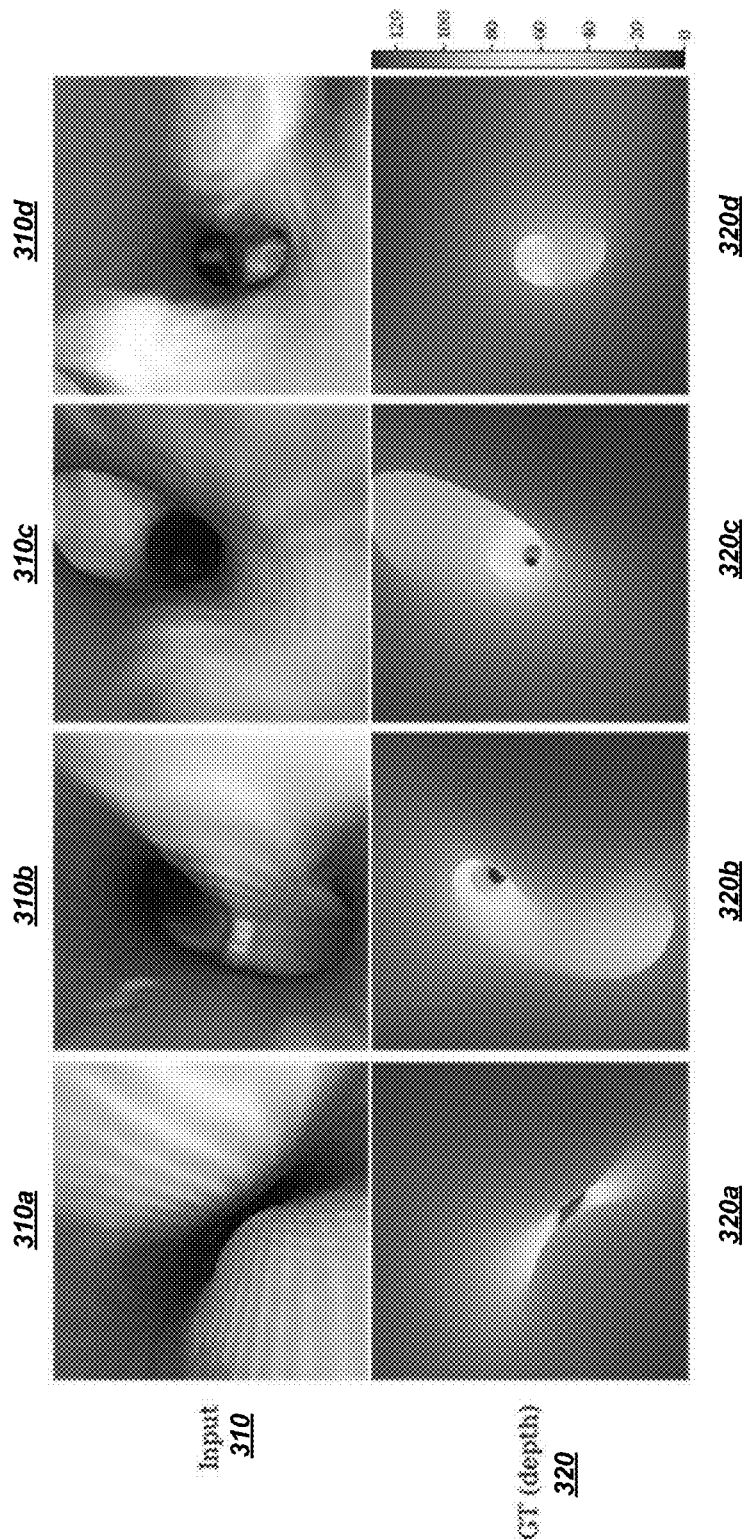
FIG. 3 illustrates exemplary synthetic images and corresponding depth images in accordance with the present disclosure.

In some embodiments, computational models may be trained using data from a synthetic domain. In one example, the synthetic dataset used in some embodiments may include a large population (for instance, 43,758) of rendered color $I_S$ and depth $D_S$ image pairs. FIG. 3 illustrates exemplary synthetic images 310a-d and corresponding depth images 320a-d in accordance with the present disclosure. The pulmonary volume utilized for data generation may be segmented from one or more computed tomography (CT) scans of a static pulmonary phantom. For the segmentation, a simulator may be configured using a computational model 134 with images rendered inside a pulmonary tree with a virtual camera using applicable image processing software. A non-limiting example of a computational model 134 may include a CNN, such as a 3D CNN. An illustrative and non-restrictive example of CNN may include a CNN as described in Jin et al., "3D Convolutional Neural Networks with Graph Refinement for Airway Segmentation Using Incomplete Data Labels," International Workshop on Machine Learning in Medical Imaging, pp. 141-149 (2017), the contents of which are incorporated by reference as if fully set forth herein. An illustrative and non-restrictive example of image processing software may include medical image processing software provided by ImFusion GmbH of München, Germany. In some embodiments, the virtual camera may be modeled after the bronchoscope's known intrinsic properties used to acquire the real images. The simulator may use, among other things, Phong shading and a local illumination model to generate the environment's lighting.

In some embodiments, the virtual camera may be placed at equidistant positions along the airway segments, for example, starting from the trachea and moving to a target position in the airway tree simulating the images acquired during a typical bronchoscopy procedure. The set of simulated images may be a combination of a plurality of such simulated paths. The orientation of the virtual camera may be adjusted within a reasonable range to simulate different viewing directions of the camera along the airway segments. The position of the virtual camera within the airway segment may be offset from the airway segment center line to simulate the location of the camera in a real bronchoscopic procedure.

Figure 4:
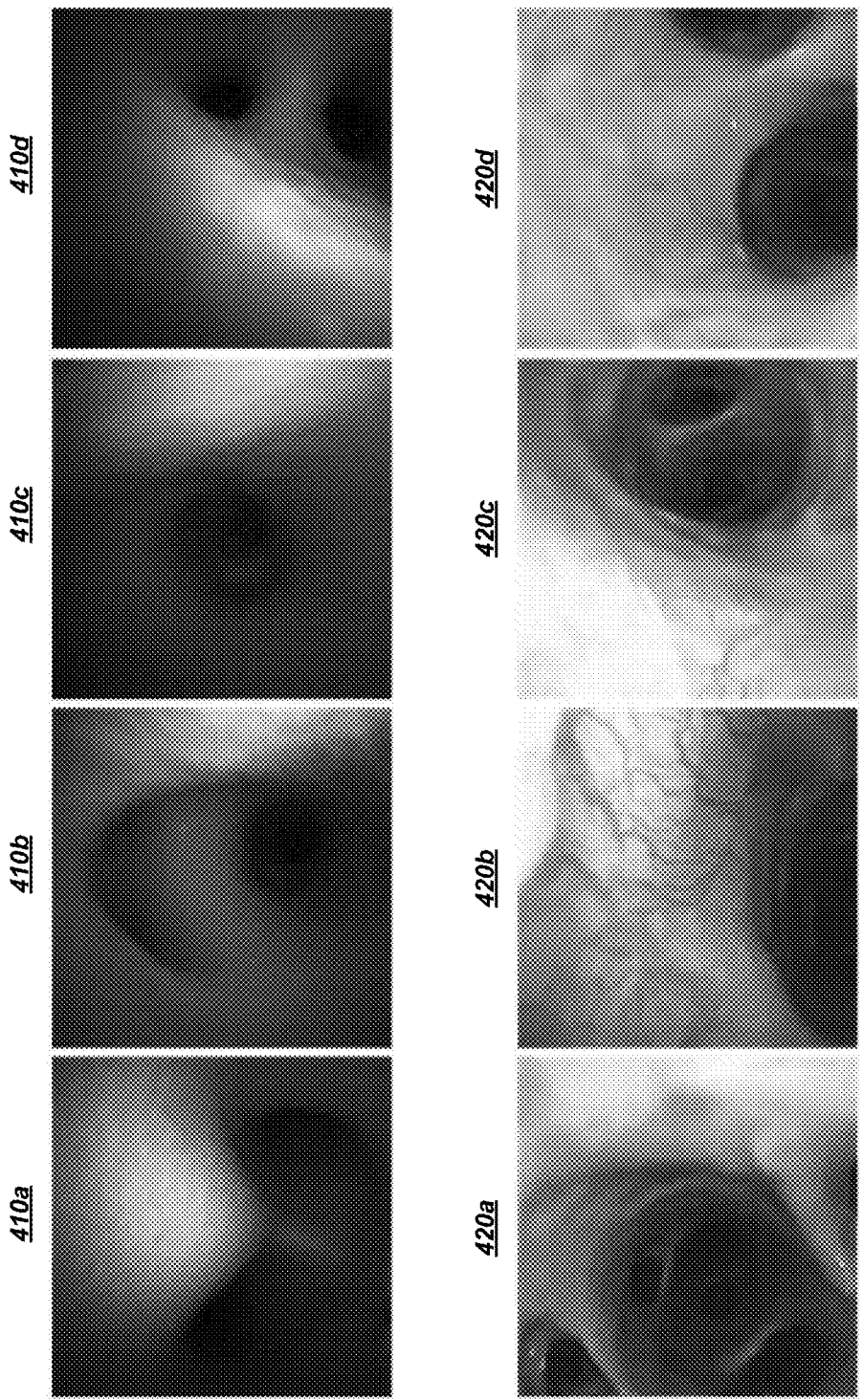
FIG. 4 illustrates exemplary real images in accordance with the present disclosure.

In some embodiments, the real monocular bronchoscopic images $I_R$ may include various datasets, such as a pulmonary phantom and in-vivo recordings of an animal patient (for instance, a dog). However, embodiments are not limited to these types of datasets as any type of real image datasets that may operate according to some embodiments are contemplated in the present disclosure. In one example, the phantom data set may be recorded inside a pulmonary phantom and rectified using the known lens properties of the bronchoscope. For training and evaluation, the dataset may be split into two unique subsets, such as a training set (for instance, seven video sequences, 12,720 undistorted frames in total) of color images that do not have corresponding depth data, and a second set of test frames (for instance, a set of 62 frames). Their corresponding 3D tracking information may be registered to the centerline of the volume of the airway tree segmented from the phantom CT and used to render synthetic depth images employed as the ground-truth information. In one example, the in-vivo animal frames are recorded inside a dog patient's pulmonary system using an unknown bronchoscope with no details on the camera properties. The resulting set of color images (for instance, 11,348 images) may be randomly split into two unique sets for training and evaluation. Their ground-truth depth images are not available; thus, this dataset may be used for qualitative analysis. FIG. 4 illustrates exemplary real images in accordance with the present disclosure. More specifically, FIG. 4 depicts real phantom images 410a-d and animal images 420a-d.

In some embodiments, diagnostic imaging processes may use supervised depth image and confidence map estimation. In some embodiments, a U-net variant may be utilized for the task of supervised depth image and confidence map estimation. Aiming at an optimal point between accuracy and runtime performance, a ResNet-18 backbone may be employed for the model's encoder part to act as the feature extractor. On the decoder side, a series of bilinear upsampling and convolutional layers may be configured to regain the input's original size. After each upsampling operation, the corresponding feature vectors from the encoder level may be concatenated to complete the skip-connection structure. The final four of these levels' output forms scaled versions of the estimated depth images and the confidence maps. This output set may be utilized in the multi-scale loss calculation.

In some embodiments, the intermediate activation functions may include exponential linear units (ELUs). A non-limiting example of ELUs is described in Clevert et al., "Fast and Accurate Deep Network Learning by Exponential Linear Units (ELUs)," Proceedings of the 4th International Conference on Learning Representations, San Juan, Puerto Rico, 2-4 May 2016, which is incorporated by reference as if fully set forth herein. In various embodiments, the final activation functions may be set to rectified linear units (ReLU) and Sigmoid, respectively, for the depth image and the confidence map estimation. A concrete change in the encoder architecture may include, among other things, the addition of the coordinate convolution layers. A non-limiting example of coordinate convolution layers is described in Liu et al., "An intriguing failing of convolutional neural networks and the coordconv solution." Advances in Neural Information Processing Systems, pages 9605-9616 (2018), which is incorporated by reference as if fully set forth herein. In some embodiments, five coordinate convolution layers are set at the skip connections and the bottleneck, right before connecting to the decoder or for the adversarial training, the discriminators. A detailed configuration of the complete model according to some embodiments is provided in Table 1.

TABLE 1

| | Layer Description | k | s | Input | Output Dimensions |
|---|---|---|---|---|---|
| #0 | Input RGB image | | | | 3 × H × W |
| | Encoding Layers | | | | |
| #1 | Conv2d → BatchNorm2d → ReLU | 7 | 2 | #0 | 64 × H/2 × W/2 |
| #2 | CoordinateConvolution | 3 | 1 | #1 | 64 × H/2 × W/2 |
| #3 | MaxPool2d | 3 | 2 | #1 | 64 × H/4 × W/4 |

TABLE 1-continued

| | Layer Description | k | s | Input | Output Dimensions |
|---|---|---|---|---|---|
| #4 | ResidualBlock | 3 | 1 | #3 | 64 × H/4 × W/4 |
| #5 | ResidualBlock | 3 | 1 | #4 | 64 × H/4 × W/4 |
| #6 | CoordinateConvolution | 3 | 1 | #5 | 64 × H/4 × W/4 |
| #7 | ResidualBlock | 3 | 2 | #5 | 128 × H/8 × W/8 |
| #8 | ResidualBlock | 3 | 1 | #7 | 128 × H/8 × W/8 |
| #9 | CoordinateConvolution | 3 | 1 | #8 | 128 × H/8 × W/8 |
| #10 | ResidualBlock | 3 | 2 | #8 | 256 × H/16 × W/16 |
| #11 | ResidualBlock | 3 | 1 | #10 | 256 × H/16 × W/16 |
| #12 | CoordinateConvolution | 3 | 1 | #11 | 256 × H/16 × W/16 |
| #13 | ResidualBlock | 3 | 2 | #11 | 512 × H/32 × W/32 |
| #14 | ResidualBlock | 3 | 1 | #13 | 512 × H/32 × W/32 |
| #15 | CoordinateConvolution | 3 | 1 | #14 | 512 × H/32 × W/32 |
| Decoding Layers | | | | | |
| #16 | Conv2d → ELU | 3 | 1 | #15 | 256 × H/32 × W/32 |
| #17 | Conv2d → ELU | 3 | 1 | ↑#16, #12 | 256 × H/16 × W/16 |
| #18 | Conv2d → ELU | 3 | 1 | #17 | 128 × H/16 × W/16 |
| #19 | Conv2d → ELU | 3 | 1 | ↑#18, #9 | 128 × H/8 × W/8 |
| $D_g$: #20 | Conv2d → ReLU | 3 | 1 | #19 | 1 × H/8 × W/8 |
| $C_g$: #21 | Conv2d → Sigmoid | 3 | 1 | #19 | 1 × H/8 × W/8 |
| #22 | Conv2d → ELU | 3 | 1 | #19 | 64 × H/8 × W/8 |
| #23 | Conv2d → ELU | 3 | 1 | ↑#22, #6 | 64 × H/4 × W/4 |
| $D_4$: #24 | Conv2d → ReLU | 3 | 1 | #23 | 1 × H/4 × W/4 |
| $C_4$: #25 | Conv2d → Sigmoid | 3 | 1 | #23 | 1 × H/4 × W/4 |
| #26 | Conv2d → ELU | 3 | 1 | #23 | 32 × H/4 × W/4 |
| #27 | Conv2d → ELU | 3 | 1 | ↑#26, #2 | 32 × H/2 × W/2 |
| $D_2$: #28 | Conv2d → ReLU | 3 | 1 | #27 | 1 × H/2 × W/2 |
| $C_2$: #29 | Conv2d → Sigmoid | 3 | 1 | #27 | 1 × H/2 × W/2 |
| #30 | Conv2d → ELU | 3 | 1 | #27 | 16 × H/2 × W/2 |
| #31 | Conv2d → ELU | 3 | 1 | ↑#30 | 16 × H × w |
| $D_1$: #32 | Conv2d → ReLU | 3 | 1 | #31 | 1 × H × W |
| $C_1$: #33 | Conv2d → Sigmoid | 3 | 1 | #31 | 1 × H × W |

In general, Table 1 depicts network architecture for depth image and confidence map estimation according to some embodiments in which k is the kernel size, s is the stride, H is the height and W is the width of the input image, ↑ is the bilinear upsampling operation, $D_h$ and $C_h$, h∈ {1, 2, 4, 8}, are the output depth images and the confidence maps of scale ratio h.

In various embodiments, a depth estimation loss process may be used. For example, targeting estimation of the depth values in the original scale as the input's, a regression loss is employed between the estimated D̃ and the ground truth depth images D. The BerHu loss B is employed as the pixel-wise error:

$$L_{depth}(D,\tilde{D})=\Sigma_{i,j}B(|D(i,j)-\tilde{D}(i,j)|,c) \quad \text{Equation (1)}$$

where D̃(i,j) and D(i,j) are the predicted and the ground-truth depth values at the pixel index (i,j), c, the threshold value component of the B, is computed over a batch as:

$$c = \frac{1}{5}\max_{t,i,j}(|D^t(i,j) - \widetilde{D^t}(i,j)|) \quad \text{Equation (2)}$$

where t is an instance of the depth images inside the batch. A non-limiting example of BerHu loss B is described in Laina et al., "Deeper depth prediction with fully convolutional residual networks," 2016 Fourth international conference on 3D vision (3DV). IEEE. 2016, pages 239-248, which is incorporated by reference as if fully set forth herein.

Various embodiments may provide scale-invariant gradient loss smoothness, which is a desired property in the output depth images. To ensure this, the scale-invariant gradient loss $L_{gradient}$ is employed as introduced in as:

$$L_{gradient}(D,\tilde{D},h)=\Sigma_{i,j}|g(D(i,j),h)-g(\tilde{D}(i,j),h)|_2 \quad \text{Equation (3)}$$

The gradient calculation is done using the discrete scale-invariant finite differences operator g with the step size h as in equation 4.4:

$$g(D(i,j),h) = \left(\frac{D(i+h,j)-D(i,j)}{|D(i+h,j)+D(i,j)|}, \frac{D(i,j+h)-D(i,j)}{|D(i,j+h)+D(i,j)|}\right)^T \quad \text{Equation (4)}$$

Some embodiments may provide for confidence loss. For example, to provide the supervision signal, the ground-truth confidence map is calculated as:

$$C(i,j)=e^{-|D(i,j)-\tilde{D}(i,j)|} \quad \text{Equation (5)}$$

Based on this, the confidence loss is defined to be the $L_1$ norm between the prediction and the ground truth as:

$$L_{confidence}(C,\tilde{C})=\Sigma_{i,j}|C(i,j)-\tilde{C}(i,j)| \quad \text{Equation (6)}$$

The following Table 2 depicts data augmentations for the synthetic and the real domains. The random values are picked from uniform distributions and the results of the color augmentations are saturated at 0 as the minimum and 1 as the maximum.

TABLE 2

| Augmentation Method | Description |
|---|---|
| Synthetic Domain | |
| Flips | Vertical and horizontal flips with a probability of 0.5. |
| Brightness | Additive jitters on the scaled brightness with a random value from [−0.2, 0.2] |
| Contrast | Additive jitters on the scaled contrast with a random value from [−0.2, 0.2] |
| Saturation | Additive jitters on the scaled saturation with a random value from [−0.2, 0.2] |
| Hue | Additive jitters on the scaled hue with a random value from [−0.1, 0.1] |
| Real Domain | |
| Flips | Vertical and horizontal flips with a probability of 0.5. |

In a multi-scale total supervised loss process, the three factors are combined with a span over the four different scales to form the total loss:

$$L_{supervised}(D, \tilde{D}_h) = \quad \text{Equation (7)}$$
$$\sum_{h\in\{1,2,4,8\}} \left(\lambda_{depth}L_{depth}(D, u_h\tilde{D}_h)\right) + \lambda_{gradient}$$
$$L_{gradient}(D, u_h(\tilde{D}_h), h) + \lambda_{confidence}L_{confidence}(C, u_h(\tilde{C}_h))$$

λs are the hyper-parameters to weight each factor, h is the ratio between the size of the predicted and the ground-truth depth images, and $u_h$ is the bilinear upsampling operator that upsamples the input image by a scale of h.

Data augmentations play a huge role in increasing the amount and variations of the training set. Two main criteria are considered while choosing the set augmentations to apply: the function should be geometry-preserving and reinforce the model against overfitting to the domain. The following Table 3 describes data augmentation according to some embodiments:

TABLE 3

| Hyper-parameter | Description | Value |
|---|---|---|
| General | | |
| Num. epochs | Number of epochs the network is trained for. | 30 |
| Batch size | Number of instances from a single domain in one training iteration. | 32 |
| $\lambda_{depth}$ | Weight of depth estimation loss. | 1 |
| $\lambda_{gradient}$ | Weight of scale-invariant gradient loss. | $2(10)^{-4}$ |
| $\lambda_{confidence}$ | Weight of confidence loss. | $1(10)^{-4}$ |
| Adam Optimizer | | |
| Learning rate (LR) | Step size for the weight update | $10^{-3}$ |
| $\beta_1$ | Exponential decay rate for the $1^{st}$ moment estimates. | 0.9 |
| $\beta_2$ | Exponential decay rate for the $2^{nd}$ moment estimates. | 0.999 |
| Multi-step Learning Rate Scheduler | | |
| Milestones | Number of iterations, as portions of the total, until learning rate is multiplied by γ | $\{1/2^{th}\}$ |
| γ | Multiplier of the learning rate at each milestone | 0.5 |

Network implementation and training may be performed using various hardware and software configurations. In one example, the network is implemented on PyTorch 1.5 and the training is done on a single Nvidia® RTX2080 graphics card. The supervised training scheme may use an Adam optimizer, for example, with a dynamic learning rate schedule to half at the midpoint of the number of epochs. Other details are provided in Table 3.

In some embodiments, unsupervised adversarial domain feature adaptation may be used, for example, to adapt a network previously trained on the synthetic renderings to increase its generalizability on the real (bronchoscopic) images.

In some embodiments, the encoder $F_S$, trained according to various embodiments on the synthetic domain, is used to adversarially train a new encoder $F_R$. For this task, three discriminators, $A^i$, where i is empirically decided as $i \in \{1, 2, 3\}$, are employed at the encoder's last two skip-connections and the bottleneck to reduce the domain gap at the feature level. During the optimization, only $F_R$'s weights are updated. At the inference, the new encoder, $F_R$, is connected to the previously trained decoder $G_S$ for depth image and confidence map estimation (see, for example, FIG. 2)

Like the other neural network models, Generative Adversarial Networks (GAN) have limited learning capacity. Trained with a lack of direct supervision for the task at hand, it is oftentimes inevitable for GANs to fall into local minima that are not the optimal hypothesis, and perhaps extremely far away than that. Given the low amount of semantic- and geometric-feature differences between the two domains, the new encoder $F_R$ is initialized with the same weights as the previously trained $F_S$. By doing so, it is expected that the adversarial training avoids a large amount of probable mode collapses on the geometrically irrelevant features. In general, the coordinate convolution layers further increase the robustness of the GAN models against the mode collapses. In the bronchoscopic scenes, the deeper regions tend to exist in certain geometric shapes, like deformed circles and ellipses consisting of darker color information. Unlike the synthetic renderings, the real images have an overall less homogenous light in the scene, creating rather ambiguous dark patches that can be misinterpreted by the model as higher depth values. In some embodiments, giving supplementary spatial awareness to the model with the employment of coordinate convolution layers may not only decrease the chance of a possible mode collapse but also ease the adversarial training process and guide to avoid regressing large depth values to the aforementioned ambiguities.

The discriminators that are utilized are based on the principle proposed for PatchGAN as described in Isola et al., "Image-To-Image Translation with Conditional Adversarial Networks," Proceedings of the IEEE Conference on Computer Vision and Pattern Recognition, pp. 1125-1134 (2017). A non-limiting example of conventional GAN discriminators is described in Goodfellow et al. Unlike conventional GAN discriminators, models according to some embodiments may generate an output grid instead of a single element. Combined with the fully convolutional structure, it results in a more comprehensive evaluation of the local features.

Each of the discriminators may employ a GAN loss. Split into its two pieces, $L_{discriminator}$ and $L_{encoder}$, it is adopted as:

$$L_{discriminator}(A,F_S,F_R,I_S,I_R) = -E_{f_S-F_S(I_S)}[\log A(F_S(I_S)] - Ef_{R-F_R(I_R)}[\log(1-A(F_R(I_R))] \quad \text{Equation (8)},$$

$$L_{encoder}(A,F_R,I_R) = Ef_{R-F_R(I_R)}[\log(1-A(F_R(I_R))] \quad \text{Equation (9)},$$

where $I_S$ and $I_R$ are color images from the synthetic and the real domains. The total adversarial loss, $L_{adversarial}$, is the sum of $L_{discriminator}$ and $L_{encoder}$ across all i, where $i \in \{1,2,3\}$ is the index of the feature tensor:

$$L_{adversarial}(A,F_S,F_R,I_S,I_R) = \Sigma_{i \in \{1,2,3\}}(L_{discriminator}(A^i, F^i_S,F^i_R,I_S,I_R) + L_{encoder}(A^i,F^i_R,I_R)) \quad \text{Equation (10)}$$

The following Table 4 describes network architecture of the discriminator for the adversarial domain feature adaptation according to some embodiments, where k is the kernel size, s the stride, C is the number of channels, H is the height and W is the width of the input feature tensor.

TABLE 4

| | Layer Description | k | s | Input | Output Dimensions |
|---|---|---|---|---|---|
| #0 | Input feature tensor | | | | C × H × W |
| Discriminator Layers | | | | | |
| #1 | Conv2d → LeakyReLU | 4 | 2 | #0 | 64 × H/2 × W/2 |
| #2 | Conv2d → InstanceNorm → LeakyReLU | 4 | 2 | #1 | 128 × H/4 × W/4 |
| #3 | Conv2d → InstanceNorm → LeakyReLU | 3 | 1 | #2 | 256 × H/4 × W/4 |
| #4 | Conv2d → InstanceNorm → LeakyReLU | 3 | 1 | #3 | 512 × H/4 × W/4 |
| #5 | Conv2d | 3 | 1 | #4 | 1 × H/4 × W/4 |

For the adversarial domain feature adaptation, a different set of data augmentations are employed for each data source. Concerning the synthetic domain, the augmentations used for the supervised training are kept, as detailed in Table 2. For the real domain images, the color augmentations are skipped to prevent introducing further complexities to the adversarial training.

The following Table 5 describes the details of the utilized adversarial training scheme. Other not-mentioned hyperparameters of the various classes and functions are set as the default values of the library.

TABLE 5

| Hyper-parameter | Description | Value |
| --- | --- | --- |
| General | | |
| Disc. locations | Layer indices of the encoder, as declared in Table 4.1, discriminators are connected to. | {#9, #12, #15} |
| Num. iterations | Number of iterations the network is trained for. | 12,000 |
| Batch size | Number of instances from a single domain in one training iteration. | 64 |
| Adam Optimizer | | |
| Learning rate (LR) | Step size for the weight update | $5(10)^{-6}$ |
| $\beta_1$ | Exponential decay rate for the $1^{st}$ moment estimates. | 0.9 |
| $\beta_2$ | Exponential decay rate for the $2^{nd}$ moment estimates. | 0.999 |
| Multi-step Learning Rate Scheduler | | |
| Milestones | Number of iterations, as portions of the total, until learning rate is multiplied by $\gamma$ | {$3/5^{th}$, $4/5^{th}$} |
| $\gamma$ | Multiplier of the learning rate at each milestone | 0.5 |

The implemented 3D reconstruction pipeline may include processes derived from a combination of the sequel publications Park et al., "Colored Point Cloud Registration Revisited," Proceedings of the IEEE International Conference on Computer Vision, pp. 143-152 (2017) and Choi et al., "Robust Reconstruction of Indoor scenes," Proceedings of the IEEE Conference on Computer Vision and Pattern Recognition, pp. 5556-5565 (2015). Essentially, the method employs a pose-graph formed by the feature-based tracking information and colored ICP for a multi-scale point cloud alignment. The pipeline is best viewed as a series of steps that consider the problem at hand from local and global perspectives.

In the first step, the RGB-D sequence is split into chunks to build local geometric surfaces, referred to as the fragments. This process employs a pose-graph for each fragment for local alignment. The edges of the pose-graphs are formed by the transformation matrices estimated, optimizing a joint photometric and geometric energy function between the adjacent frames of the subsequences. Additionally, loop-closures are considered by using a 5-point RANSAC algorithm over ORB-based feature matching between the key-frames. Lastly, the pose-graphs are optimized using a robust non-linear optimization method, and the point clouds are generated.

The second step registers the point clouds using a global scale pose-graph. Like the previous step, the edges of the pose-graph between the adjacent nodes are formed by the estimated transformation matrices. For this, the last RGB-D frame of the former and the first RGB-D frame of the latter point clouds are matched using the photometric and geometric energy function, as in the first step. Additionally, loop-closures are considered using a similar approach employing the fast point feature histograms (FPFH) features of the non-adjacent point-cloud pairs. Finally, a robust non-linear method is employed to optimize the pose-graph.

The third step refines the previously developed global pose graph using the multiscale point cloud alignment. This step aims to lower the chances of getting the optimization stuck at local minima by considering the smoother optimization surfaces of the function at the coarser levels. A point-cloud pyramid is built with increasing voxel size to down sample the point-cloud at each level. Colored ICP, a joint photometric and geometric objective, is employed as the optimization function to tackle the alignment along both the normal direction and the tangent plane.

In the last step, the local and the global pose graphs are combined to assign the poses of the RGB-D frames. Ultimately, each of them is integrated into a single truncated signed distance function (TSDF) volume to create the final mesh.

It is observed that the fundamental source of the domain-gap between the synthetic and the real images are the differences in the illumination and reflectance properties of the tissue. Moreover, in the in- and ex-vivo scenes, obstructions by mucus and other natural elements occur and may stick on the camera. All these visual features and artifacts are often misinterpreted by the network only trained on the synthetic images.

The approach's main focus is to increase the robustness of the network, trained on the synthetic images, to the visual changes when run on the real data. In these experiments, we quantitatively and qualitatively evaluate the performance of the proposed method.

Experiment I: Performance Analysis on the Pulmonary Phantom Dataset

For this experiment, the network is trained in the two-step approach configured according to some embodiments. The supervised training is done using the complete set of the synthetic domain, 43,758 color and depth image pairs, for 30 epochs with the hyper-parameters shown in Table 3. The second-step, adversarial domain feature adaptation, is executed on the training split, 12,720 frames, of the phantom scenes. Trained for 12,000 iterations, the employed hyper-parameters are given in Table 5. Data augmentations applied to synthetic and real domains are as described in Table 2.

Equation (11)

$$\text{Mean Absolute Relative Difference: } \frac{1}{2}\sum\nolimits_{t,i,j} \frac{|D^t(i,j) - \widehat{D}^t(i,j)|}{D^t(i,j)}$$

$$\text{Root Mean Squared Error } (RMSE): \sqrt{\frac{1}{N}\sum\nolimits_{t,i,j} (D^t(i,j) - \widehat{D}^t(i,j))^2}$$

$$\text{Accuracy: \% of } D^t(i,j) \text{ s.t. } \max\left(\frac{D^t(i,j)}{\widehat{D}^t(i,j)}, \frac{\widehat{D}^t(i,j)}{D^t(i,j)}\right) = \delta < \sigma$$

The quantitative analysis is considered using three evaluation metrics: where N is the total number of pixels across all instances t in the test set and σ is the threshold.

The test images are a subset of 188 frames with their EM tracking information. To have a more accurate evaluation, the alignments between the rendered and the original images are analyzed by visually assessing the overlappings in the prominent edges. As a result, 62 of the better renderings are chosen for the test.

In the following Table 6, the method is evaluated, comparing the model before and after the adversarial domain feature adaptation is employed. For the sake of simplicity, the former is named "vanilla," and the latter "domain-adapted." The results show that the adopted adversarial domain adaptation step improves the base, vanilla, at all metrics. Table 6 describes Quantitative analysis of the impact of the domain adaptation step on depth estimation. Ground-truth data is rendered from the pulmonary phantom based on the bronchoscope's EM tracking signal, registered to the pre-operatively taken CT volume, using ImFusion Suite software. Adequate registrations are cherry-picked manually, narrowing down the test set to 62 real color-, synthetic depth-image pairs. The color images are undistorted using the known lens properties. The depth values are in mm. The best value for each metric is inscribed in bold letters.

TABLE 6

| Model | Mean abs. rel. diff. | RMSE | Accuracy $\sigma = 1.25$ | $\sigma = 1.25^2$ | $\sigma = 1.25^3$ |
|---|---|---|---|---|---|
| Vanilla | 0.699 | 8.145 | 0.348 | 0.587 | 0.747 |
| Domain-adapted | 0.379 | 7.532 | 0.458 | 0.735 | 0.856 |

Figure 5:
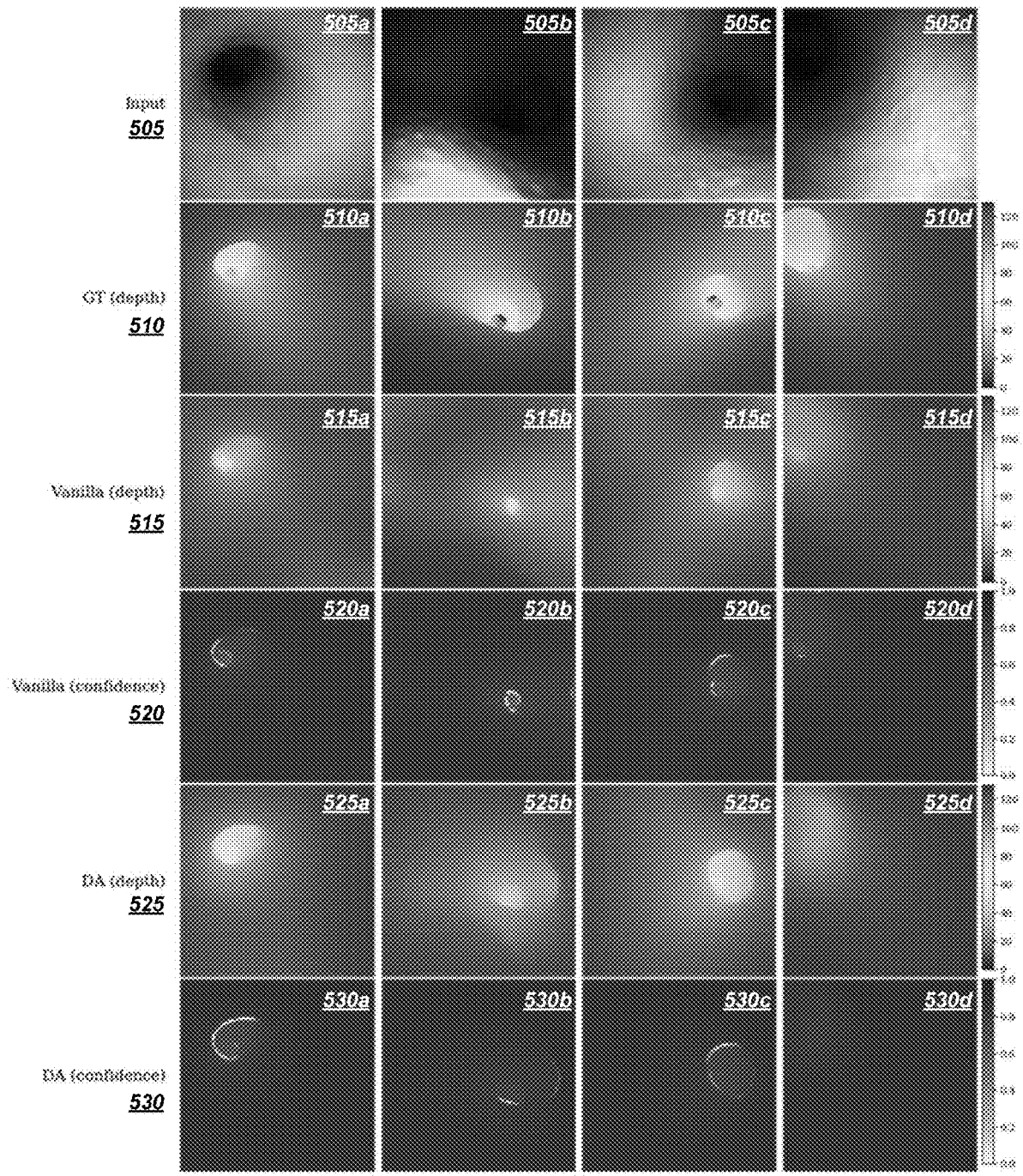
FIG. 5 illustrates exemplary depth images based on real image input in accordance with the present disclosure.

During the first-step of supervised training, it is observed that the learned confidence is lower at the deeper locations and the high-frequency components of the images like edges and the corners. The first property is interpreted to be caused by the ambiguities in the darker regions, while the latter is supported by virtue of the scale-invariant gradient loss, introduced in Equation (3). FIG. 5 illustrates exemplary depth images based on synthetic image input in accordance EXPERIMENT I of the present disclosure. In particular, FIG. 5 depicts input images 505a-d, ground truth depth images 510a-d, vanilla depth images 515a-d, vanilla confidence maps 520a-d, domain-adapted depth images 525a-d, and domain-adapted confidence maps 530a-d. As observed via FIG. 5, the vanilla network shows difficulties generalizing to the bronchoscope's relatively smoother image characteristics. Additionally, it shows poor performance at the patches at the image's borders with darker colors. This experiment shows, inter alia, that adversarial domain-feature adaptation readjusts the encoder to accommodate both of these characteristics of the real images.

Experiment II: Performance Analysis on the Animal Patient Dataset

In this experiment, the vanilla network's training strategy, the first step, is kept the same as described in Table 3. The second-step, adversarial domain feature adaptation, is executed on the training split, 9,078 frames, of the in vivo scenes captured from a dog patient. This specific anatomy has more bronchi to furcate with finer visual details. In this experiment, 6,000 iterations of training is a good balance to fine-tune for the domain-specific features while preserving the more granular details. The rest of the hyper-parameters are as stated in Table 5 and the data augmentations in Table 2.

Executed on the test split of 2,270 frames, the qualitative analysis on the vanilla network reveals that it is misled by high spatial-frequency features like vessels and lumps. Combined with darker texture, these areas show a tendency to be wrongly regressed to greater depth values. However, the domain-adapted network behaves more stable against these deceitful cues. Additionally, it bares improvements capturing the topology around the bifurcations, which are significantly finer in detail compared to the synthetic and the pulmonary phantom data. Another discrepancy between this specific tissue and the aforementioned ones is the higher non-Lambertian reflectance property. While the vanilla network is often deceived by the contours generated by the specular reflections, interpreted as greater depth, the results reveal that the domain-adaptation step teaches the model to be more robust against them.

Figure 6:
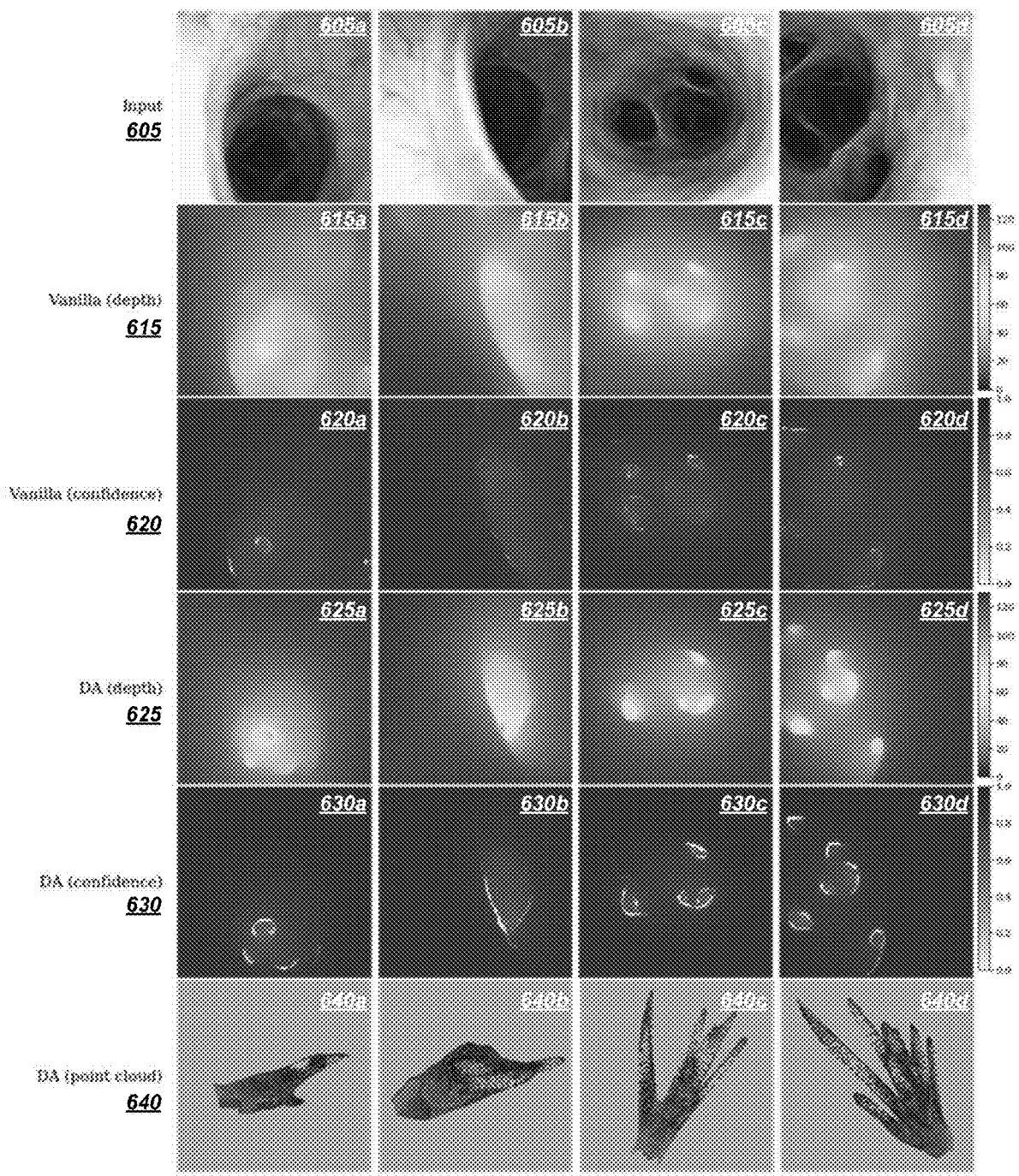
FIG. 6 illustrates exemplary depth images and anatomical models based on real image input in accordance with the present disclosure.

In this assessment, some of the shortcomings of the adversarial domain feature adaption method are likewise revealed. FIG. 6 illustrates exemplary depth images based on image input in accordance EXPERIMENT II of the present disclosure. In particular, FIG. 6 depicts input images 605a-d, vanilla depth images 615a-d, vanilla confidence maps 620a-d, domain-adapted depth images 625a-d, domain-adapted confidence maps 630a-d, and computational models 640a-d in the form of point clouds.

Experiment III: Effect of Coordinate Convolution on Adversarial Domain Feature Adaptation In general, coordinate convolution may have an effect on adversarial domain feature adaptation. For example, by virtue of their architecture, neural networks may have a limited capacity. When it comes to generative adversarial networks, this property becomes highly crucial because the unsupervised training scheme might fit a different feature-level attribute of the data than the one intended, resulting in a mode collapse. Coordinate convolutions may provide an additional signal about the feature vector's spatial properties. In the following experiments, the effect of coordinate convolution on the adversarial domain feature adaptation is evaluated on the previously used pulmonary phantom and the animal patient datasets. For the fairness of the comparison, the models are trained with identical hyper-parameters as introduced in, respectively, EXPERIMENT I and EXPERIMENT II.

Figure 7:
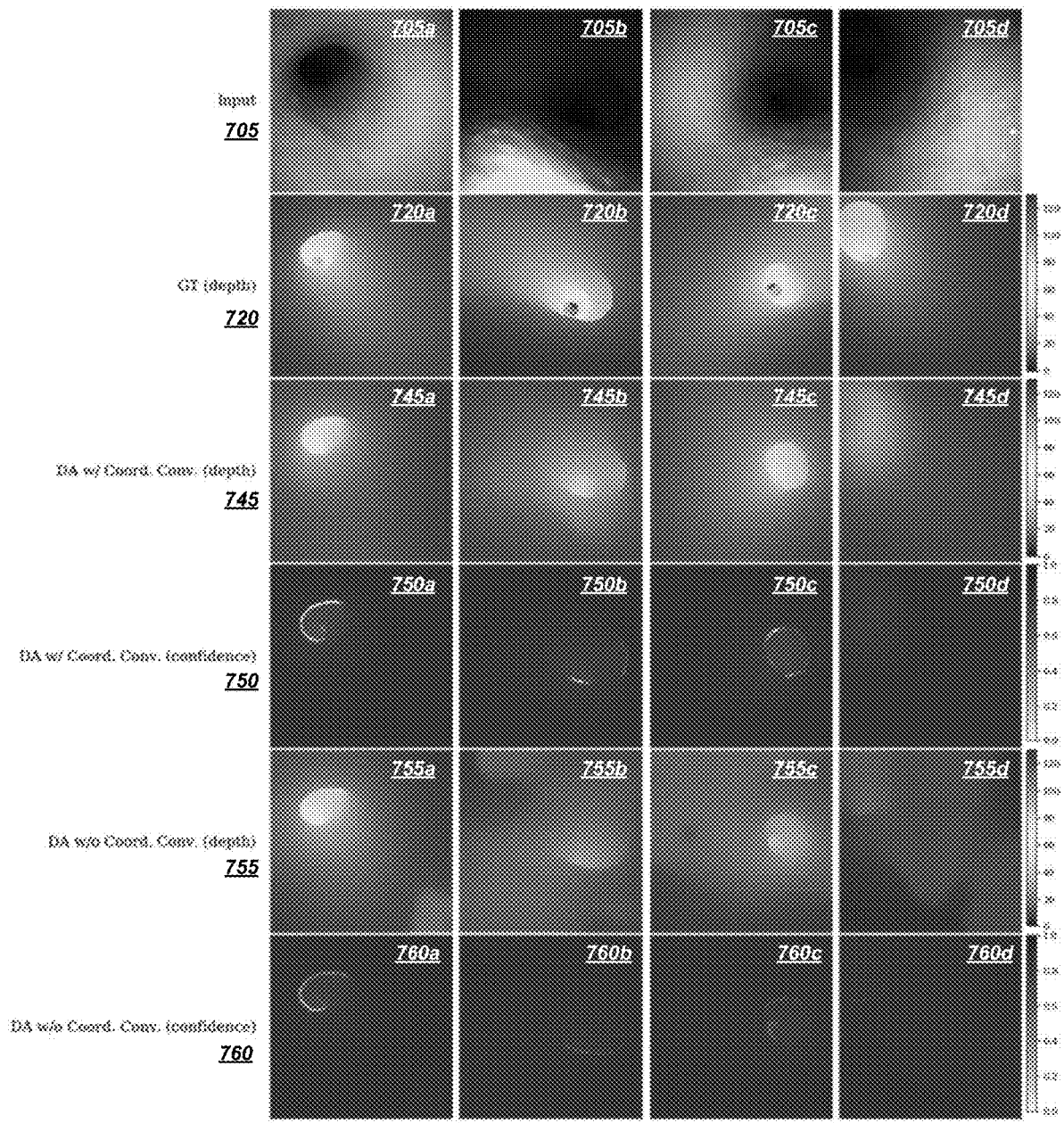
FIG. 7 illustrates exemplary depth images based on real image input in accordance with the present disclosure.

FIG. 7 illustrates exemplary depth images and confidence maps based on image input in accordance with the present disclosure with and without coordinate convolution layers. In particular, FIG. 7 depicts input images 705a-d, ground truth depth images 720a-d, domain-adapted with coordinate convolution depth images 745a-d, domain-adapted with coordinate convolution confidence maps 750a-d, domain-adapted without coordinate convolution depth images 755a-n, domain-adapted without coordinate convolution confidence maps 760a-d. FIG. 7 shows that, compared to the model with coordinate convolution layers, the model without shows a decrease in robustness against the specular reflections and certain high spatial frequency features.

As shown in FIG. 7, during the adversarial training, the model without the coordinate convolution layers is overfitted to a certain mode to exhibit a tendency to estimate a deeper region with lower confidence on arbitrary locations of the images. Additionally, it is quantitatively confirmed in the following Table 7 that the model may experience a drop in its performance both before and after the adversarial training, without the coordinate convolutions.

TABLE 7

| Model | Mean abs. rel. diff. | RMSE | Accuracy $\sigma = 1.25$ | $\sigma = 1.25^2$ | $\sigma = 1.25^3$ |
|---|---|---|---|---|---|
| Vanilla without Coord. Conv. | 0.659 | 8.407 | 0.315 | 0.570 | 0.733 |
| Domain-adapted without Coord. Conv. | 0.543 | 8.505 | 0.324 | 0.695 | 0.835 |
| Vanilla with Coord. Conv. | 0.699 | 8.145 | 0.348 | 0.587 | 0.747 |
| Domain-adapted with Coord. Conv. | 0.379 | 7.532 | 0.458 | 0.735 | 0.856 |

In generally, Table 7 depicts the quantitative analysis of the effect of coordinate convolution layers on depth estimation. Ground-truth data is rendered from the pulmonary phantom based on the bronchoscope's EM tracking signal, registered to the pre-operatively taken CT volume, using ImFusion Suite software. Adequate registrations are cherry-picked manually, narrowing down the test set to 62 real color-, synthetic depth-image pairs. The color images are undistorted using the known lens properties. The depth values are in mm. The best value for each metric is inscribed in bold letters.

Evaluations on the animal patient dataset, which has a larger domain gap with the synthetic, qualitatively reflect a similar performance degradation.

Figure 8:
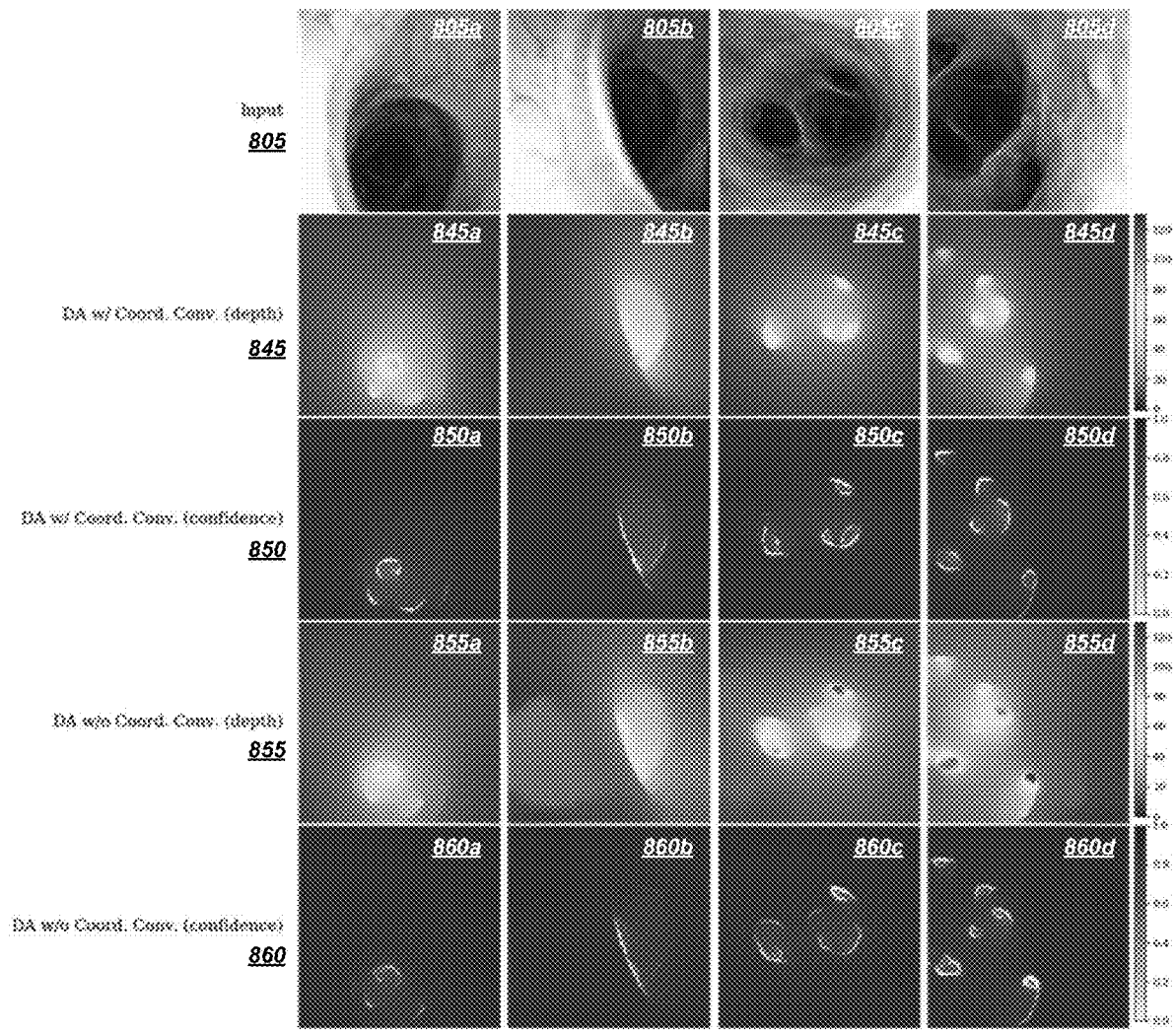
FIG. 8 illustrates exemplary depth images based on real image input in accordance with the present disclosure.

FIG. 8 illustrates exemplary depth images and confidence maps based on image input in accordance with the present disclosure with and without coordinate convolution layers. In particular, FIG. 8 depicts input images 805a-d, domain-adapted with coordinate convolution depth images 845a-d, domain-adapted with coordinate convolution confidence maps 850a-d, domain-adapted without coordinate convolution depth images 855a-n, domain-adapted without coordinate convolution confidence maps 860a-d. FIG. 8 shows that, compared to the model with coordinate convolution layers, the model without shows a decrease in robustness against the specular reflections and certain high spatial frequency features.

Experiment IV: 3D Reconstruction

In this experiment, two different sequences are used for a qualitative assessment of the proposed depth estimation network's employment in the 3D reconstruction pipeline. The depth images are predicted using the model trained for the depth estimation of EXPERIMENT I.

Figure 9:
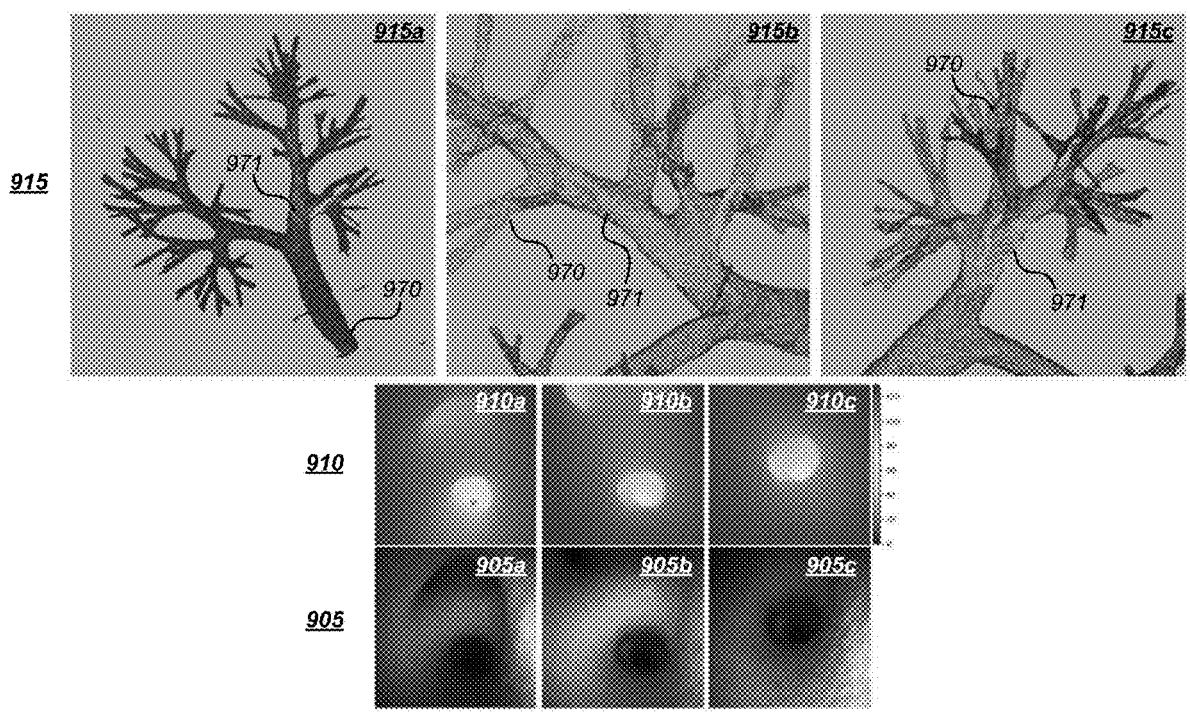
FIG. 9 illustrates exemplary anatomical models in accordance with the present disclosure.

FIG. 9 illustrates exemplary anatomical models in accordance with the present disclosure. More specifically, FIG. 9 displays anatomical models 915a-c generated based on images 905a-c and depth images 910a-c. In general, anatomical models 915a-c may be generated based on the reconstruction of a short sequence consisting of 55 frames. The reconstructed point-cloud 971 is manually overlayed and scaled onto the segmented airway-tree 970 using ImFusion Suite software. One approach for aligning the reconstructed point-cloud onto the segmented airway-tree includes using the Iterative Closest Point (ICP) algorithm. The initial, middle and last frames from the sequence (1005a-c) are displayed with their corresponding, estimated depth images (1010a-c). While pivoting forward, the scope follows a downwards tilting motion from the beginning of the sequence, creating an occlusion for the upper bifurcation point and the bronchus floor in the deeper locations in the last frames. This results in inaccuracies in the reconstruction of the aforementioned points.

Figure 10:
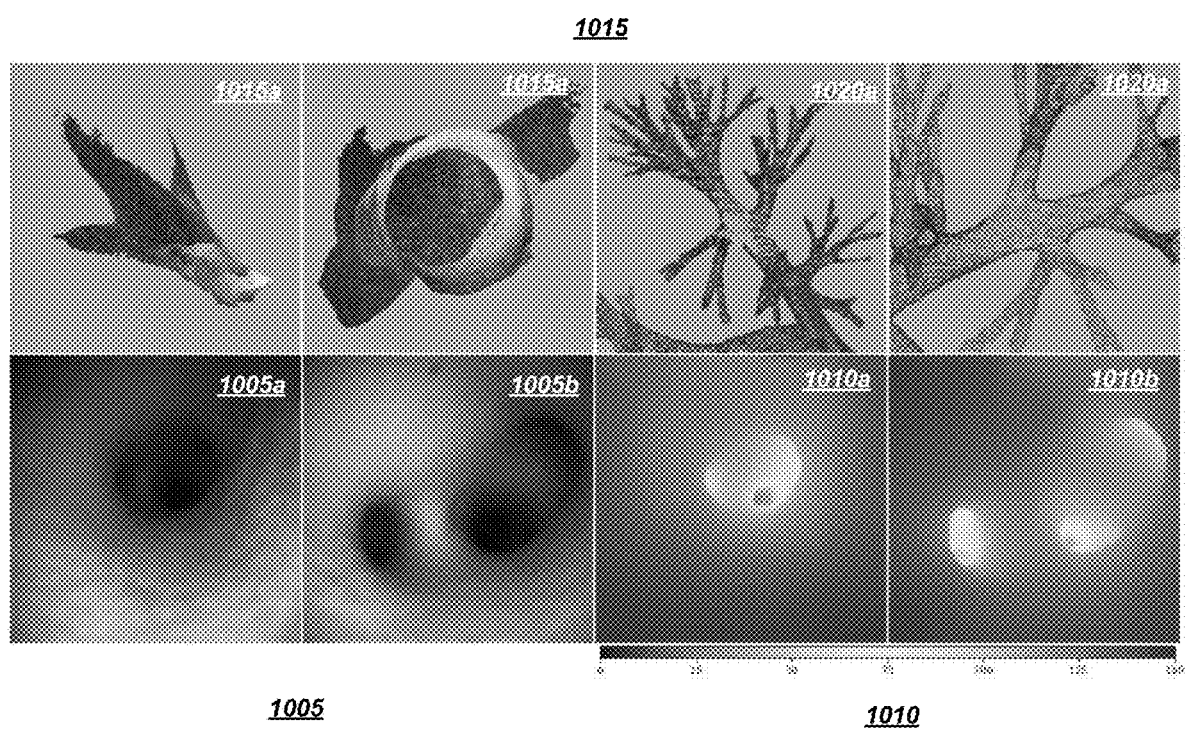
FIG. 10 illustrates exemplary anatomical models in accordance with the present disclosure.
Figure 11:
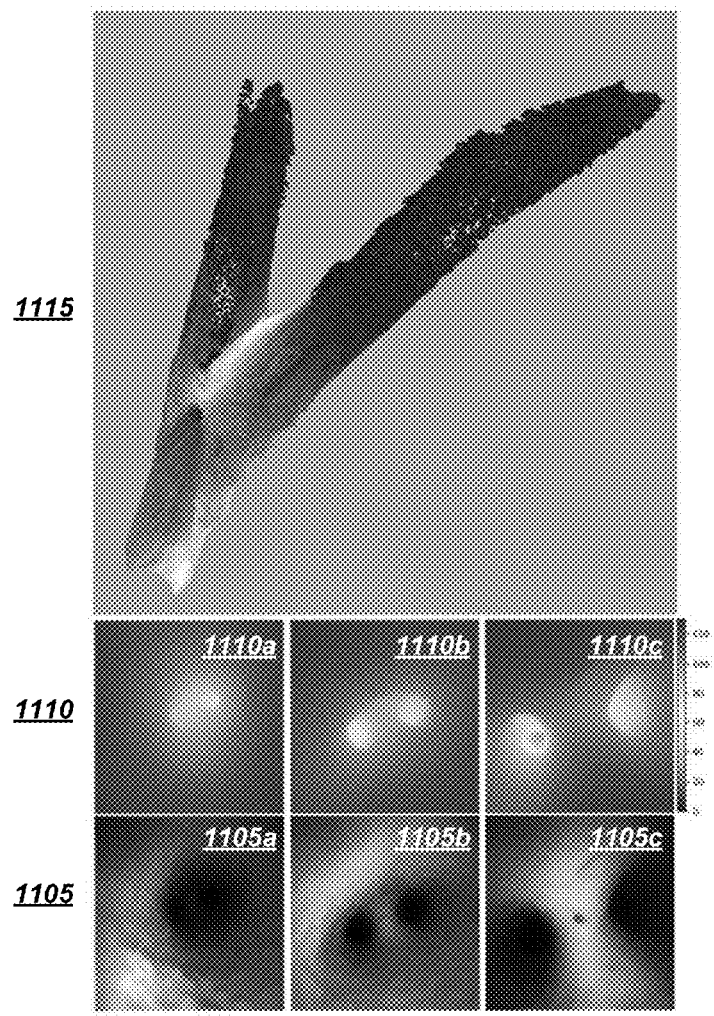
FIG. 11 illustrates exemplary anatomical models in accordance with the present disclosure.

FIG. 10 illustrates exemplary anatomical models in accordance with the present disclosure. In FIG. 10, a sequence of 300 frames are used for the 3D reconstruction of anatomical models in the form of point clouds 1015a, 1015b and images 1020a, 1020b of point clouds overlayed on segmented airway-trees generated based on images 1005a, 1005b and associated depth images 1010a, 1010b. The sequence is initialized at a mid-point of a bronchus, and the bronchoscope is driven to the next bifurcation point and ended. The point cloud is displayed with the color information obtained from the input, and the initial, middle, and last frames from the sequence are displayed with their corresponding, estimated depth images. In another example, FIG. 11 illustrates exemplary anatomical models in accordance with the present disclosure. More specifically, FIG. 11 shows anatomical models, for a sequence of 1,581 frames, in the form of a point cloud 1115a generated based on images 1105a-c and associated depth images 1110a-c.

In some embodiments, image processing methods and systems may operate to perform monocular depth estimation in bronchoscopic scenes, for example, using in a two-step deep learning pipeline. A U-Net based model with a ResNet-18 feature extractor as the encoder is employed in the first step for supervised learning of the depth and corresponding confidence information from rendered, synthetic images.

A non-limiting example of ResNet is provided in He et al., "Deep residual learning for image recognition," Proceedings of the IEEE conference on computer vision and pattern recognition. 2016, pages 770-778 and a non-limiting example U-net is provided in Ronneberger et al., "U-net: Convolutional networks for biomedical image segmentation," International Conference on Medical image computing and computer-assisted intervention. Springer. 2015, pages 234-241, both of which are incorporated by reference as if fully set forth herein.

In the second step, the network is refined utilizing a domain adaptation process based on to increase the network's generalizability on real images. This section employs adversarial training at multiple feature levels of the encoder to ultimately decrease the domain gap between the two sources of images. Trained in an unsupervised manner, the training set of the second step is composed of unpaired frames. A non-limiting example of a domain adaption process is described in Vankadari et al., "Unsupervised Monocular Depth Estimation for Night-Time Images Using Adversarial Domain Feature Adaptation," European Conference on Computer Vision, pp. 443-459 (2020), which is incorporated by reference as if fully set forth herein.

It is often difficult to train generative adversarial networks (GAN) because they are prone to get caught in a mode collapse. To increase the resilience against this phenomenon, in the training procedure, coordinate convolution layers are employed on the connecting nodes between the encoder and the decoder. Since geometry-related features in the images are observed to be similar across the domains, the new encoder trained in the adversarial training is initialized with the weights of the source encoder previously trained on the synthetic images. The discriminators are modeled after PatchGAN for a more comprehensive evaluation of the local features. The synthetic images are rendered using ImFusion Suite software, based on a segmented airway tree from a CT scan of a pulmonary phantom. The real images may be acquired from two sources: the pulmonary phantom and an animal patient.

In the present disclosure, methods and systems according to some embodiments are assessed in quantitative and qualitative tests on the aforementioned datasets. Moreover, models according to some embodiments may be integrated into a 3D reconstruction pipeline for a feasibility test. The quantitative analysis on the pulmonary phantom dataset reveals that the adversarial domain feature adaptation improves the base model's, also referred to as the vanilla model, performance across all the metrics by a considerable margin. The improvement is further visually apparent in the generated results. Compared to the vanilla, the domain-adapted model shows the better capability of depth perception in the target domain's smoother image characteristics. Moreover, the results show that the domain-adapted model according to some embodiments performs better on the darker patches around the image's borders. This indicates, among other things, that the employed domain feature adaptation method is capable of refining the vanilla model to accommodate a part of the illumination and sensory changes across the domains. On the animal patient dataset, besides the aforementioned discrepancies, a more prominent texture change is existent in the visible domain gap. The visual inspection of the results reveals that the domain-adapted model behaves more robustly against the deceitful cues such as high spatial frequency components like vessels and lumps and intensity gradients generated by the stronger specular reflections. Moreover, it captures the topology more descriptively at the furcations, which have a finer structure and a higher number of bronchi to branch out than in the synthetic and the pulmonary phantom datasets. Overall, the experiment demonstrates that the adversarial domain feature adaptation is also capable of refining a model across different anatomies. Tested on both datasets, it is confirmed that coordinate convolution layers play a role in avoiding mode collapses and improving the network's accuracy. The 3D reconstruction pipeline displays improved results over conventional methods and systems, demonstrating the ability to integrate for localization and reconstruction applications for endoscopic, including bronchoscopic, operations of processes according to some embodiments.

In exemplary embodiments, the number and the variation in the quantitative tests may be increased for generating, training, testing, and/or the like image processing methods and systems. Even though it is challenging to acquire ground truth depth data of the real bronchoscopic sequences, more realistic rendering methods like Siemens VRT technology can be employed for generating color and depth image pairs for evaluation.

Some embodiments may be configured to use a Bayesian method, heteroscedastic aleatoric uncertainty, to improve the accuracy and precision in confidence regression.

Similar to coordinate convolution layers, camera convolution includes camera parameters into the convolution layers. Methods and systems according to some embodiments may, among other things, effectively increases a model's generalizability for depth prediction across different sensors with greater accuracy, beneficial for deployment with bronchoscopes from different brands. Furthermore, combined with the non-Lambertian surface characteristics of the pulmonary tissue, the joint motion of the strong probe of light on the bronchoscope breaks the illumination consistency, oftentimes leading to instability of depth prediction of a certain location across frames. In some embodiments, a loss function may be integrated with an affine model of light, which the bronchoscopic SLAM and 3D reconstruction applications could benefit from.

Two-step adversarial domain feature adaptation methods according to some embodiments are capable of depth image and confidence map estimation in bronchoscopic scenes. The approach has an effective second step of adapting a network, trained on a synthetic dataset with supervision, to generalize on real bronchoscopic images in an unsupervised adversarial training. Image processing methods and systems according to some embodiments may use a domain adaptation scheme operative to improve over the base model, accommodating for various sources of domain gaps such as illumination, sensory, and anatomical discrepancies. In some embodiments, for example, integration of methods and systems into a 3D reconstruction pipeline may allow for localization and reconstruction applications for medical imaging operations, such as bronchoscopic operations.

Figure 12:
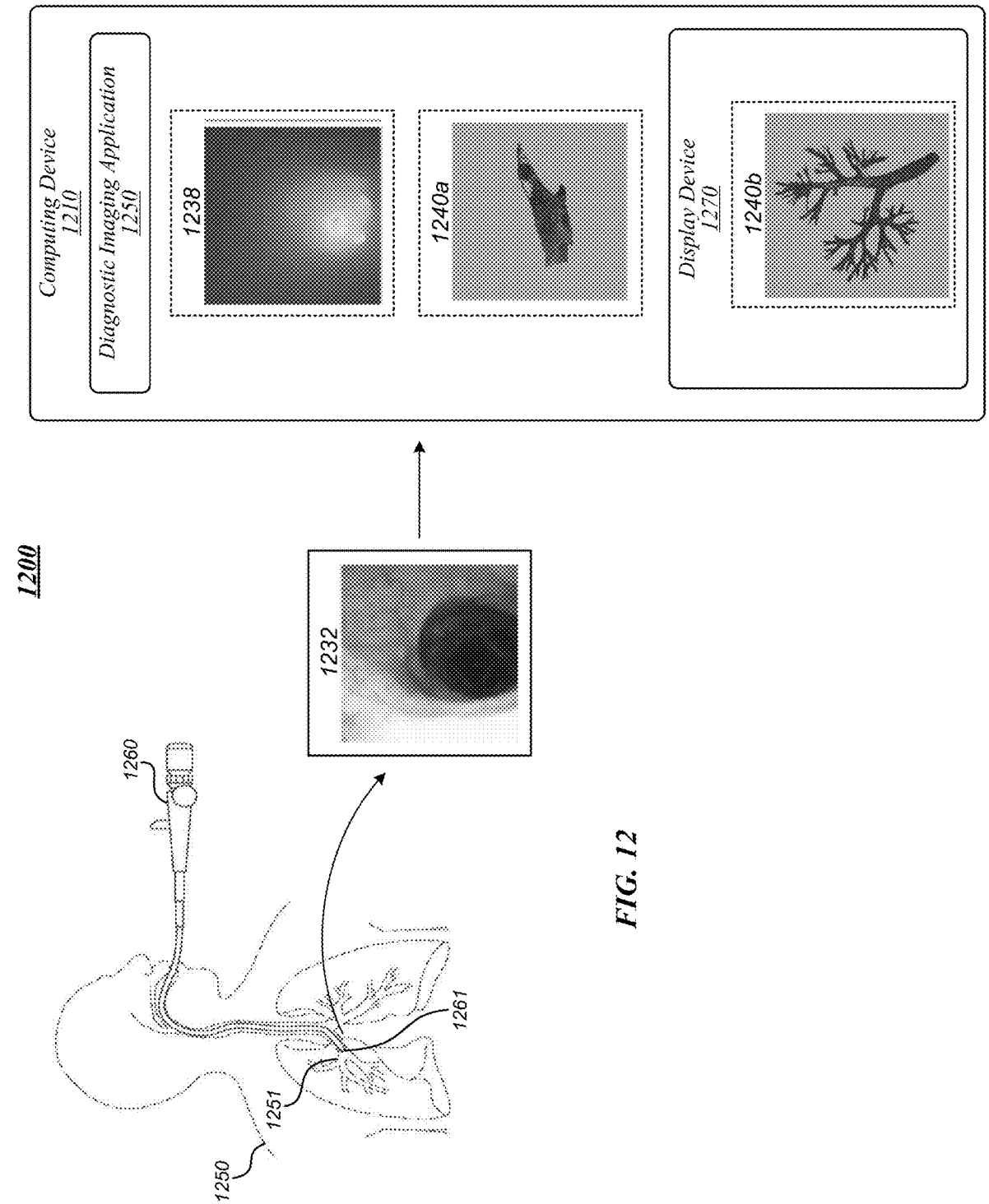
FIG. 12 illustrates a second exemplary operating environment in accordance with the present disclosure.

FIG. 12 illustrates an example of an operating environment 1200 that may be representative of some embodiments. As shown in FIG. 12, operating environment 1200 may include a bronchoscope 1260 having a camera sensor 1261 configured to be inserted into the lung pathways 1251 of a patient 1250. In some embodiments, camera sensor 1261 may be configured to capture monocular color images 1232. A computing device 1210 may be configured to execute a diagnostic imaging application 1250 operative to perform diagnostic imaging processes according to some embodiments.

Monocular color images 1232 from bronchoscope 1260 may be received at computing device 1210 for processing by diagnostic imaging application 1250. In various embodiments, diagnostic imaging application 1250 may include and/or may access computational models trained on bronchoscopic images according to various embodiments. Diagnostic imaging application 1250 may provide monocular color images 1232 as input to the trained computational models. Depth images and/or confidence maps 1238 may be generated by the trained computational models. In some embodiments, the trained computational models may be used as part of a 3D reconstruction pipeline to generate 3D anatomical models 1240a, such as point cloud models. In various embodiments, an updated anatomical model 1240b depicting a 3D bronchial scene of the location of the camera sensor 1261 may be presented on a display device 1270 to a surgeon or other medical professional performing the bronchoscopic procedure. In this manner, the medical professional may have an accurate 3D visualization of lung 1251 for navigation and/or examination purposes.

Figure 13:
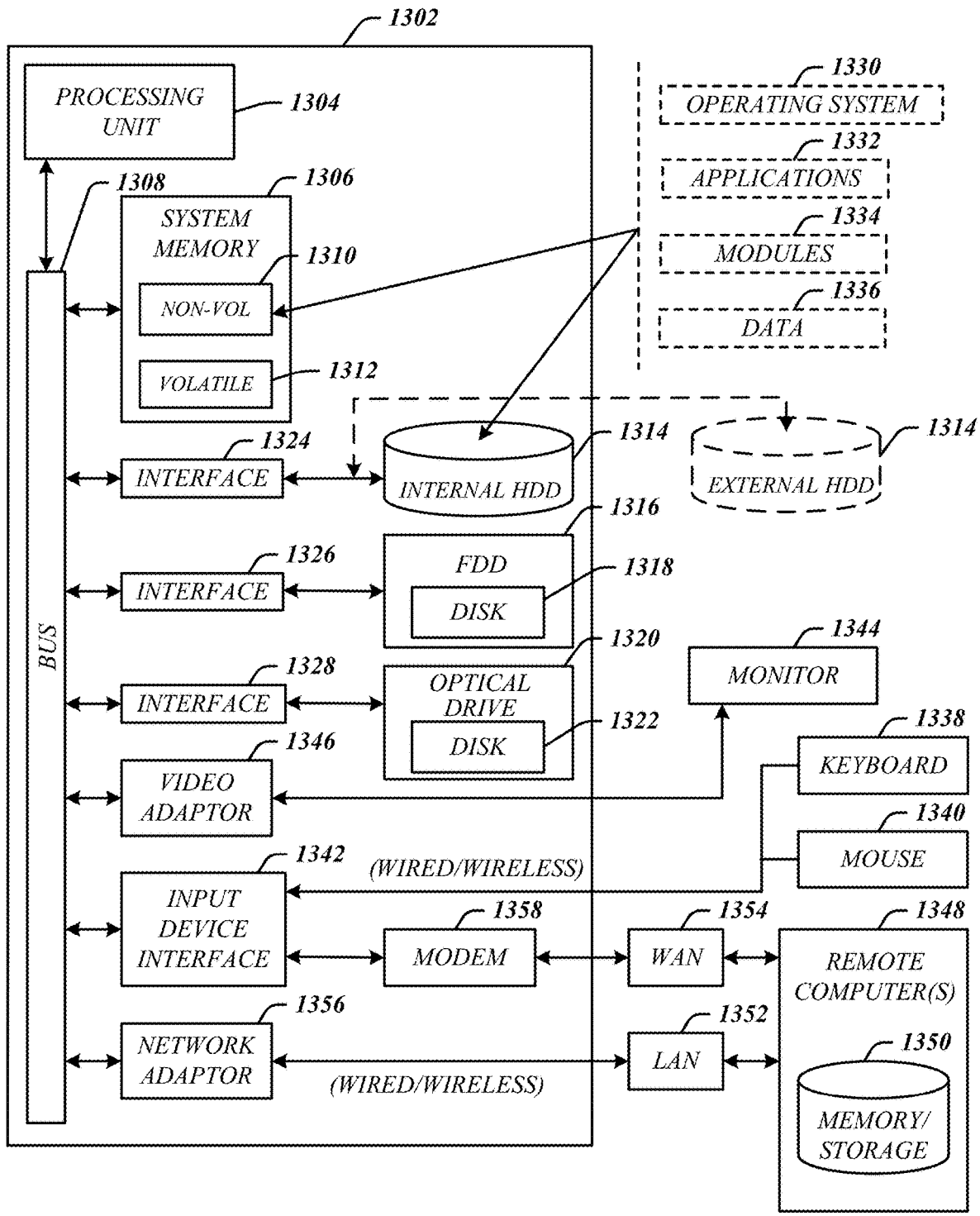
FIG. 13 illustrates an embodiment of a computing architecture in accordance with the present disclosure.

FIG. 13 illustrates an embodiment of an exemplary computing architecture 1300 suitable for implementing various embodiments as previously described. In various embodiments, the computing architecture 1300 may comprise or be implemented as part of an electronic device. In some embodiments, the computing architecture 1300 may be representative, for example, of computing device 110 and/or 1310. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 may be a commercially available processor and may include dual microprocessors, multi-core processors, and other multi-processor architectures.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1311, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1114 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of computing device 110.

A user can enter commands and information into the computer 1302 through one or more wired/wireless input devices, for example, a keyboard 1338 and a pointing device, such as a mouse 1340. These and other input devices are often connected to the processing unit 1304 through an input device interface 1342 that is coupled to the system bus 1308, but can be connected by other interfaces.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wired and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

The computer 1302 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An apparatus, comprising:
   at least one processor;
   a memory coupled to the at least one processor, the memory comprising instructions that, when executed by the at least one processor, cause the at least one processor to:
   access a plurality of endoscopic training images comprising a plurality of synthetic images and a plurality of real images, access a plurality of depth ground truths associated with the plurality of synthetic images, perform supervised training of at least one computational model using the plurality of synthetic images and the plurality of depth ground truths to generate a synthetic encoder and synthetic decoder in a first training process, and
   perform domain adversarial training on the synthetic encoder using the plurality of real images to generate a real image encoder for the at least one computational model in a second training phase subsequent to the first training phase, wherein the real image encoder is generated as a separate encoder distinct from the synthetic encoder.

2. The apparatus of claim 1, the instructions, when executed by the at least one processor, to cause the at least one processor to perform an inference process on the plurality of real images using the real image encoder and the synthetic decoder to generate depth images and confidence maps.

3. The apparatus of claim 1, the real image encoder comprising at least one coordinate convolution layer.

4. The apparatus of claim 1, the plurality of endoscopic training images comprising bronchoscopic images.

5. The apparatus of claim 4, the plurality of endoscopic training images comprising images generated via bronchoscope imaging of a phantom device.

6. The apparatus of claim 1, the instructions, when executed by the at least one processor, to cause the at least one processor to:
   provide a patient image as input to the trained computational model, generate at least one anatomical model corresponding to the patient image.

7. The apparatus of claim 6, the instructions, when executed by the at least one processor, to cause the at least one processor to generate a depth image and a confidence map for the patient image.

8. The apparatus of claim 6, the instructions, when executed by the at least one processor, to cause the at least one processor to present the at least one anatomical model on a display device to facilitate navigation of an endoscopic device.

9. A computer-implemented method, comprising, via at least one processor of a computing device:
   accessing a plurality of endoscopic training images comprising a plurality of synthetic images and a plurality of real images;
   accessing a plurality of depth ground truths associated with the plurality of synthetic images;
   performing supervised training of at least one computational model using the plurality of synthetic images and the plurality of depth ground truths to generate a synthetic encoder and synthetic decoder in a first training process; and performing domain adversarial training on the synthetic encoder using the plurality of real images to generate a real image encoder for the at least one computational model in a second training process subsequent to the first training process, wherein the real image encoder is generated as a separate encoder distinct from the synthetic encoder.

10. The computer-implemented method of claim 9, comprising performing an inference process on the plurality of real images using the real image encoder and the synthetic decoder to generate depth images and confidence maps.

11. The computer-implemented method of claim 10, the real image encoder comprising at least one coordinate convolution layer.

12. The computer-implemented method of claim 9, the plurality of endoscopic training images comprising bronchoscopic images.

13. The computer-implemented method of claim 12, the plurality of endoscopic training images comprising images generated via bronchoscope imaging of a phantom device.

14. The computer-implemented method of claim 9, comprising:
providing a patient image as input to the trained computational model, generating at least one anatomical model corresponding to the patient image.

15. The computer-implemented method of claim 14, comprising generating a depth image and a confidence map for the patient image.

16. The computer-implemented method of claim 15, comprising presenting the at least one anatomical model on a display device to facilitate navigation of an endoscopic device.

17. The computer-implemented method of claim 16, comprising performing an examination of a portion of a patient represented by the at least one anatomical model using the endoscopic device.

18. A diagnostic imaging system, comprising:
an endoscope;
a computing device operatively coupled to the endoscope, the computing device comprising:
at least one processor;
a memory coupled to the at least one processor, the memory comprising instructions that, when executed by the at least one processor, cause the at least one processor to:
access a plurality of endoscopic training images comprising a plurality of synthetic images and a plurality of real images,
access a plurality of depth ground truths associated with the plurality of synthetic images, perform supervised training of at least one computational model using the plurality of synthetic images and the plurality of depth ground truths to generate a synthetic encoder and synthetic decoder in a first training process, perform domain adversarial training on the synthetic encoder using the plurality of real images to generate a real image encoder for the at least one computational model in a second training process subsequent to the first training process, wherein the real image encoder is generated as a separate encoder distinct from the synthetic encoder.

19. The diagnostic imaging system of claim 18, the instructions, when executed by the at least one processor, to cause the at least one processor to:
provide a patient image as input to the trained computational model, the patient image captured via the endoscope, generate at least one anatomical model corresponding to the patient image.

20. The diagnostic imaging system of claim 19, the instructions, when executed by the at least one processor, to cause the at least one processor to present the anatomical model on a display device to facilitate navigation of the endoscopic device within a portion of the patient represented by the at least one anatomical model.

* * * * *